United States Patent
Rosenthal

(10) Patent No.: US 12,318,896 B2
(45) Date of Patent: Jun. 3, 2025

(54) PRESS JAW, DRIVE PRESS JAW, PRESS INSERT AND SYSTEM FOR PRESSING FITTINGS WITH PIPES

(71) Applicant: Viega Technology GmbH & Co. KG, Attendorn (DE)

(72) Inventor: Jörg Rosenthal, Reichshof-Eckenhagen (DE)

(73) Assignee: Nemak, S.A.B. de C.V., Nuevo Leon (MX)

( * ) Notice: Subject to any disclaimer, the term of this patent is extended or adjusted under 35 U.S.C. 154(b) by 0 days.

(21) Appl. No.: 18/281,715

(22) PCT Filed: Mar. 14, 2022

(86) PCT No.: PCT/EP2022/056505
§ 371 (c)(1),
(2) Date: Sep. 12, 2023

(87) PCT Pub. No.: WO2022/194761
PCT Pub. Date: Sep. 22, 2022

(65) Prior Publication Data
US 2024/0181613 A1    Jun. 6, 2024

(30) Foreign Application Priority Data

Mar. 17, 2021    (EP) .................................... 21163134

(51) Int. Cl.
*B25B 27/10*    (2006.01)
*F16L 13/14*    (2006.01)

(52) U.S. Cl.
CPC ............ *B25B 27/10* (2013.01); *F16L 13/141* (2013.01); *F16L 2013/145* (2013.01)

(58) Field of Classification Search
CPC    B25B 27/02; B25B 27/10; B25B 7/02; B25B 7/06; B25B 7/12; B21D 39/04;
(Continued)

(56) References Cited

U.S. PATENT DOCUMENTS

| | | | |
|---|---|---|---|
| 5,148,698 A | | 9/1992 | Dischler |
| 5,307,664 A | * | 5/1994 | Homm .................... B25B 27/10 72/401 |

(Continued)

FOREIGN PATENT DOCUMENTS

| | | |
|---|---|---|
| CA | 2489601 A1 | 12/2003 |
| CN | 107000174 A | 8/2017 |

(Continued)

OTHER PUBLICATIONS

Machine translation of DE 102007047339 A1 (Year: 2009).*
Machine translation of DE 102014109749 A1 (Year: 2016).*
Machine translation of DE 202005008125 U1 (Year: 2006).*

*Primary Examiner* — Jimmy T Nguyen
*Assistant Examiner* — Teresa A Guthrie
(74) *Attorney, Agent, or Firm* — The Webb Law Firm

(57) ABSTRACT

A press jaw has a drive press jaw and a replaceable press insert which can be coupled thereto, to a drive press jaw having coupling elements, to a press insert having a coupler which can be used as a press jaw insert or as a press loop, and to a system for pressing fittings with tubes, having a modular design with a press jaw, at least two press inserts with different diameters, and a tension insert, wherein the tension insert and the drive press jaw form a tension jaw.

25 Claims, 23 Drawing Sheets

Figure 1A:
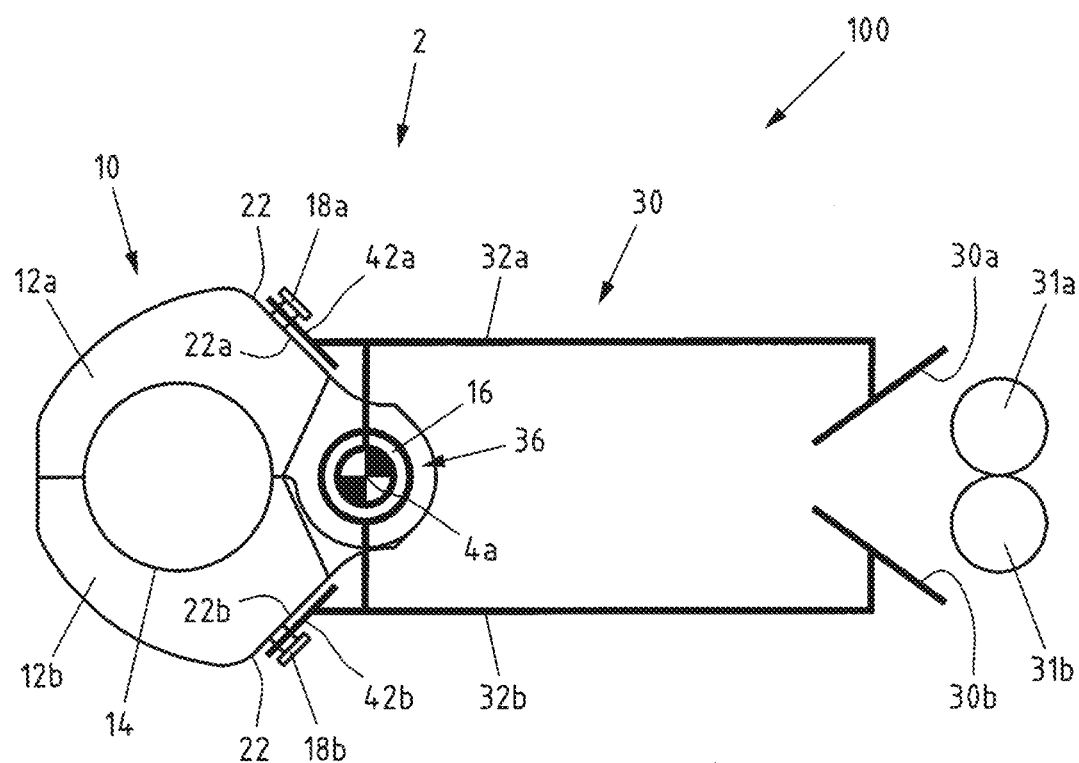

(58) Field of Classification Search
CPC ... B21D 39/046; B21D 39/048; F16L 13/141;
F16L 2013/145
USPC .................. 72/409.01, 409.16, 409.19, 416
See application file for complete search history.

(56) References Cited

U.S. PATENT DOCUMENTS

| | | | |
|---|---|---|---|
| 6,164,106 | A | 12/2000 | Nghiem et al. |
| 7,237,427 | B2* | 7/2007 | Viegener .............. B21D 39/046 |
| | | | 29/237 |
| 10,439,351 | B2 | 10/2019 | Frenken |
| 2008/0072436 | A1 | 3/2008 | Frenken |
| 2016/0099533 | A1 | 4/2016 | Kehoe |
| 2018/0131151 | A1 | 5/2018 | Chahrour |

FOREIGN PATENT DOCUMENTS

| | | |
|---|---|---|
| CN | 107107317 A | 8/2017 |
| DE | 102004045156 A1 | 3/2006 |
| DE | 202005008125 U1 | 11/2006 |
| DE | 102007047339 A1 | 4/2009 |
| DE | 102014109749 A1 | 1/2016 |
| EP | 3381618 A1 | 10/2018 |

* cited by examiner

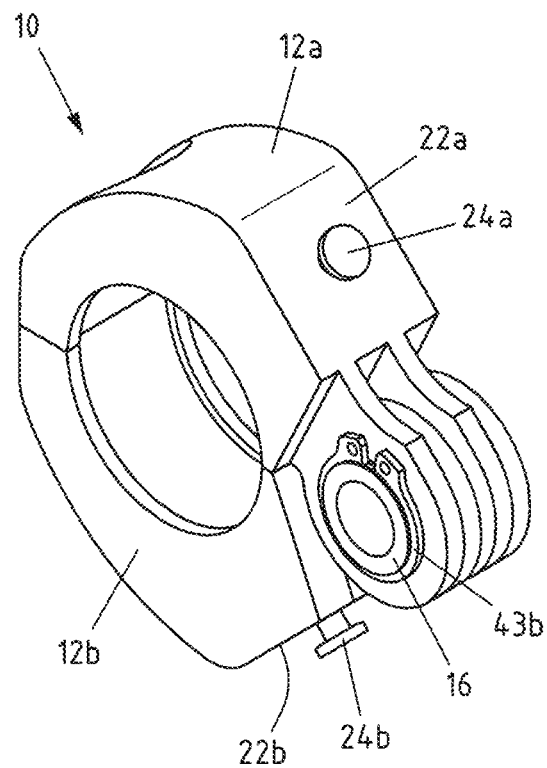
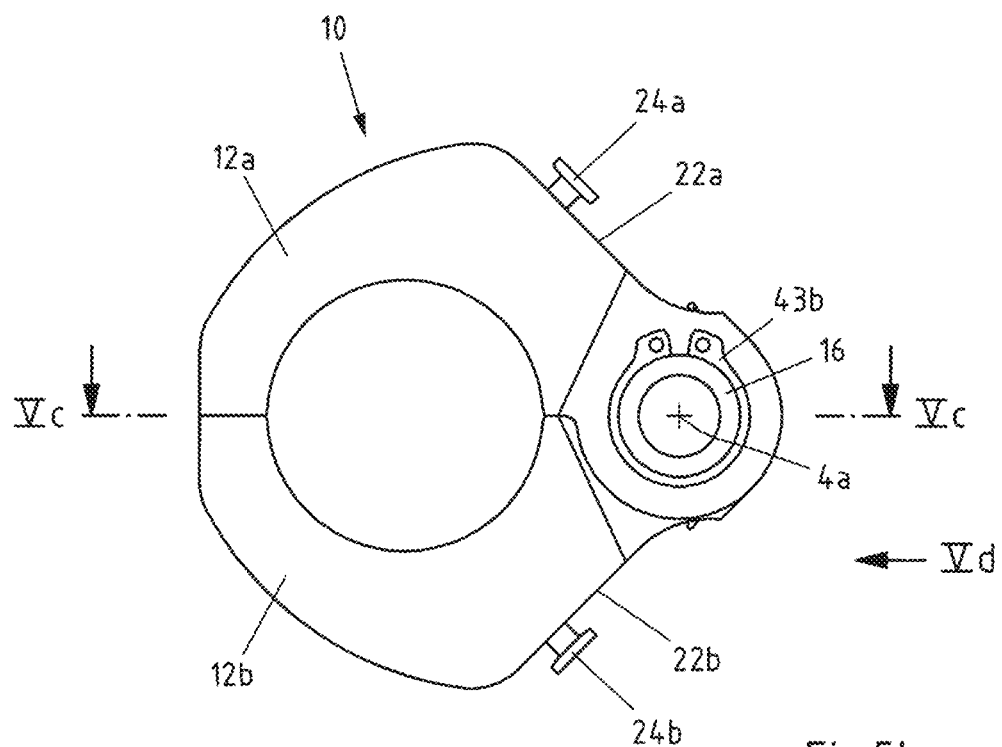
Fig.5a
Fig.5b

PRESS JAW, DRIVE PRESS JAW, PRESS INSERT AND SYSTEM FOR PRESSING FITTINGS WITH PIPES

CROSS-REFERENCE TO RELATED APPLICATIONS

This application is the United States national phase of International Application No. PCT/EP2022/056505 filed Mar. 14, 2022, and claims priority to European Patent Application No. 21163134.6 filed Mar. 17, 2021, the disclosures of which are hereby incorporated by reference in their entireties.

BACKGROUND OF THE INVENTION

Field of the Invention

The invention relates to a press jaw for pressing fittings with pipes, with a press insert and with a drive press jaw, and to a system for pressing fittings with pipes, with at least two press inserts and with a drive press jaw.

The invention also relates to a drive press jaw for pressing fittings with pipes by means of a press insert, with two drive press jaw halves, with joint elements for connecting the drive press jaw halves, with coupling elements for releasably connecting with a press insert and with force transmission elements.

The invention also relates to a press insert for pressing fittings with pipes, with at least two press segments, with press contours formed in the press segments, with joint means for connecting the press segments, with coupling means for releasably connecting with a drive press jaw and with force transmission means. At least two press segments are used as parts of a press jaw for pressing the fittings.

Finally, the invention also relates to a system for pressing fittings with pipes, with at least two press inserts and with a drive press jaw.

DESCRIPTION OF RELATED ART

The technical field relevant to the present invention is the on-site installation of piping systems, in which a piping system consisting of pipe sections and fittings is generally installed for conducting and guiding a fluid, i.e. a liquid or a gas. A fitting is generally understood to be a connector for a pipeline, and a fitting is most commonly used to connect two or more pipe sections. Accordingly, the fitting preferably has two or more press sections, for example in the form of press sleeves. The most common fittings include straight connections, changes of direction in the form of pipe bends, reducers, branches such as T-pieces or crossings. However, a fitting is also understood to be a pipe connection of a fitting or other component. For example, thermometers or pressure gauges as fittings have only one connection for a pipe section. Thus, the fitting of a fitting only has a press section to connect a pipe section to the fitting.

For the connection of the pipe sections with the fittings and other components, press connections are used in which a press section of a fitting is formed radially inwards by means of a press jaw when the pipe section is inserted so that a permanent and tight, possibly even non-detachable connection is produced. The fittings can be provided with a sealing agent, for example an O-ring, which ensures the tightness of the connection, or can also be formed by means of direct contact between the materials of the pipe section and the fitting, for example a metallic seal.

Press techniques for radial forming of the press section are mainly radial-acting press systems as well as press systems that use radial-axial pressing, whereby a part of the fitting is axially displaced during the pressing process in order to effect radial forming.

The piping systems described above are used in particular to transport drinking or heating water, gas for operating a heating system or industrial gases. In principle, any fluid medium can be transported in the pipelines.

Suitable materials for rigid pipes are, on the one hand, solid and high-strength materials, especially metallic materials or hard plastics. Rigid pipes are preferably used in an installation with larger straight sections along walls or ceilings or within wall or ceiling constructions.

Flexible pipes, on the other hand, are used in installations, especially plastic pipes, so-called all-plastic pipes, or pipes made of composite materials, so-called multilayer composite pipes, consisting of one or more layers of plastic and one or more thin layers of metal. Flexible pipes are used in particular for the installation of pre-wall technology such as retrofitted sanitary installations, where in confined spaces the flexible pipes are often bent to shape on site and installed in a curved state.

Furthermore, the rigid pipes and the flexible pipes are available in various outer diameters. For metal pipes, outside diameters in the range of 6 mm-108 mm and larger up to approx. 150 mm corresponding to 6 inches are used. In the case of plastic pipes, the outer diameters are usually in the range of 6 mm-63 mm, although significantly larger outer diameters are also used here.

Rigid pipes and flexible pipes differ, regardless of the material property and dimensioning of the pipe, in that a rigid pipe can be connected by an externally sealing fitting, whereas a flexible pipe can only be connected by an internally sealing fitting. Because of the rigid property, the dimensional stability of the rigid pipe is sufficiently large to absorb the forces that occur during radial pressing and to ensure the sealing and holding or fixing function together with the pressed fitting. Flexible pipes, on the other hand, are supported from the inside by a support sleeve and are moulded onto the support sleeve when the fitting is pressed. Fittings for rigid pipes are therefore externally sealing fittings and fittings for flexible pipes are internally sealing fittings.

When laying a piping system using both rigid pipes and flexible pipes, matching pipe dimensions are selected for the inner and outer diameters. The exact values may then only match by chance in pairs, so matching dimensions are selected with as good a match as possible. In combination with the specific fittings for rigid pipes and flexible pipes, there are thus usually specific fitting geometries and press jaw geometries for each system or dimension.

Therefore, different press jaws must be kept ready on a construction site for different pipelines and fittings. In particular, the expenditure on the construction site is high, as a number of press jaws driven by one press tool or even different press tools may have to be kept in stock. This results in a very large variety of products and the associated production, storage and logistics and the associated high acquisition costs for the user.

Different types of press jaws are used. On the one hand, press jaws are known that each have one press contour. These are also called standard press jaws and have a considerable weight as a set for several press contours.

On the other hand, systems for pressing fittings with pipes are known which have at least two press inserts, but usually a whole set of press inserts, with which different fittings with corresponding press contours can be pressed. The press inserts are coupled in pairs with the drive press jaw in order to be used afterwards for pressing a fitting. A set of press inserts for, for example, six press dimensions with outer dimensions of 12, 15, 18, 22, 28 and 35 mm or six pairs of single press inserts belong to the system together with the drive press jaw. This saves a certain amount of weight compared to standard press jaws, as only one drive press jaw is necessary.

Moreover, the individual press inserts are usually not connected to each other and can therefore be interchanged, so that different press jaws with different press contours are coupled to the drive press jaw and used. This results in incorrect pressing of the fittings. Likewise, the press inserts can be lost more easily, so that pairs of press jaws fall apart. Furthermore, the press inserts of interchangeable press jaws are usually difficult to grip. In addition, the press jaws often get mixed up.

Furthermore, the outer dimensions of the press jaws of the drive press jaw are formed for the largest press dimension. In contrast, the outer dimensions of a standard press jaw are usually optimized for the respective press dimension, so that the dimensions and weight are as small as possible. Accordingly, the press jaws of the drive press jaw are oversized for smaller press dimensions in terms of dimensions. At the same time, accessibility to the pressing point is restricted and the total weight of the press jaw with exchangeable press inserts is greater compared to a standard press jaw.

As a rule, the loading mechanisms of the known systems for changing the press inserts require two-hand operation and involve two work steps. This makes handling the press systems more difficult. At the same time, the coupling mechanisms weaken the construction in direct comparison to the standard press jaw, while the installation space remains the same. With the same strength, the exchangeable press jaw is heavier and larger than the standard press jaw.

In addition, press loops consisting of two or more press segments are known, which are placed around the area of the fitting to be pressed and are pressed together at the open end by means of a pull jaw in order to press the fitting. For this purpose, the press loop has a recess on both press segments or on the two outer press segments, in which the pull jaw engages and pulls the press loop into the closed state. In this way, the fitting is pressed by means of the press sling. Press slings are often used in areas of the installation that are difficult to access, for example in room corners, when it is difficult or impossible to apply a press jaw. The pull jaw can then be operated at a greater distance from the fitting without having to reach around the fitting itself.

The press slings must also be kept in stock for all press dimensions, which further increases the effort on a construction site.

DE 10 2007 047 339 A1 discloses a press jaw for pressing fittings with pipes. The press insert is releasably coupled to the drive press jaw via a spring device, the coupling elements being arranged opposite each other on the press jaw halves, predominantly in the center of the press contour, between the inlet opening and the joint means of the press jaw. The coupling mechanism requires two-hand operation to exchange the press inserts. The press surfaces are arranged at positions coinciding with the coupling elements. This arrangement causes predominantly vertical force components to be transmitted from the drive press jaw to the press insert during the pressing process, preventing the press insert from disengaging from the press jaw. It has a detrimental effect on the dimensions of the press jaw.

From EP 3 381 618 A1 and DE 20 2005 008125 U1, press means for an application as a press sling with a suitable tool are further known.

SUMMARY OF THE INVENTION

The aim of the present invention is therefore to further reduce the overall weight of a system for pressing fittings with pipes and to enable a convenient one-hand change of the press inserts on the drive press jaw. Furthermore, a multiple use of the press inserts is to be achieved in order to extend the functionality of the system and its components.

Therefore, the present invention is based on the technical problem of further improving the handling and the application possibilities of the press jaw, the drive press jaw, the press insert and the system for pressing fittings with pipes.

The above technical problem is solved according to a first teaching by a press jaw for pressing fittings with pipes with a press insert and with a drive press jaw, wherein the press insert includes at least two press segments, a press contour formed in the press segments, joint means for connecting the press segments, coupling means for releasably connecting with the drive press jaw and force transmission means, wherein the drive press jaw includes two drive press jaw halves, joint elements for connecting the drive press jaw halves, coupling elements for releasably connecting with the press insert and force transmission elements, wherein the joint means pivotably connect the press insert to the drive press jaw and wherein the force transmission means and the force transmission elements are arranged at least predominantly, preferably completely, in an area between the center of the press contour and the joint means.

In the press jaw according to the invention, the press insert is connected to the coupling elements of the drive press jaw by means of the coupling means and the press insert is actuated by a movement of the drive press jaw.

The area between the center of the press contour and the joint means can be described as follows: when looking at the press jaw in a side view, the press jaw is aligned horizontally, the drive of the press tool runs horizontally. The axis of the press contour is perpendicular to the side view, wherein the center of the press contour preferably corresponds to the axis of the press contour and thus to the axis of the pipe to be joined. The orientation of the axis of the joint means of the press insert is also perpendicular to the side view. The area between the center of the press contour and the joint means then corresponds to the space between a plane extending perpendicular to the axis of the press contour and perpendicular to the horizontal direction and a plane extending perpendicular to the axis of the joint means and perpendicular to the horizontal direction.

In this design of the press jaw, the force transmission through the two force transmission elements into the press insert does not run in opposite directions and parallel, but at an angle to each other. The forces therefore do not cancel each other out and a force resultant is created as a linear force component.

The force transmission means and the force transmission elements together generate a force compressing the press insert, which is directed away from the drive press jaw from the position of the joint means. When the force is divided into a vertical component directed towards the center of the press contour and a horizontal component perpendicular thereto, the resulting force has a non-zero horizontal component which is preferably directed horizontally away from the joint means.

Therefore, the press insert is mounted on bearings in relation to the drive press jaw in order to be able to compensate for the effect of the force resultant. The drive press jaw therefore no longer has to grip around the press insert to a large extent, so that the drive press jaw takes up less volume overall, has a lower weight and is easier to operate.

In a preferred manner, the force transmission means and the force transmission elements are each formed as contact surfaces. This realizes a two-dimensional force transmission independent of the coupling of the press inserts with the drive press jaw halves of the drive press jaw, which distributes the contact pressure evenly. Even though the coupling means can also transmit a force because of the mechanical contact, the separation of the coupling elements and the force transmission elements also achieves an extensive separation of the functions of coupling and force transmission.

The contact surfaces preferably in pairs have an angle α greater than 10°, preferably greater than 25°, in particular greater than 40° to each other. An angle α greater than 80° has proven to be an optimal angle. The contact surfaces are preferably flat so that they can be assigned a plane. Alternatively, the contact surfaces can be round or curved, in which case the contact surfaces can be assigned a central planar course, for example by forming a plane arranged at the end points of the contact surfaces or a tangential plane arranged at a central position of the contact surfaces perpendicular to a surface normal. The angle is measured between the planes of the contact surfaces of the press segments or of the two drive jaw halves, whereby an angle of 0° means planes running parallel to each other.

If the contact surfaces are preferably flat, there is a larger surface oriented perpendicular to the direction of force transmission through the drive press jaw to the press insert, so that the force transmission can be designed more effectively. If the outer sides of the press segments and/or the contact surfaces are preferably round, so that the outer sides of the two press segments lie on the radius of a common circle at least in sections when the press insert is closed, the process of coupling the press insert with the drive press jaw is simplified.

There are various possibilities for the arrangement of the axes or rotational axes of the various elements of the press jaw. In a preferred design of the press jaw, the press insert and the drive press jaw halves are pivotable about a same axis. Thus, both the two press segments of the press insert as well as the two drive press jaw halves rotate around the same axis, the joint means and the joint elements are thus arranged to rotate and pivot on the same axis. With this design of the press jaw, when the drive press jaws are rotated, the press segments of the press insert are driven to pivot about the same axis, so that the contact surfaces of the drive press jaw and press segment are not displaced against each other during the rotation.

In an alternative design of the press jaw, the press insert and the drive press jaw halves are pivotable about different axes, wherein the drive press jaw halves can have the same axis or different axes. This enables a design with two or three axes whose positions in relation to each other can be optimized with regard to the geometric and/or force properties.

For this design of the press jaw, it is further preferred that the joint means are formed as a hollow pin supporting two press segments each. The two press segments are arranged on the hollow bolt and slide over its surface during rotation. The hollow pin feature allows the use of a locking pin of the drive press jaw by inserting the locking pin into the hollow pin and placing it therein.

Furthermore, it is preferred that the joint elements of the drive press jaw have a hollow pin connecting both drive press jaw halves. The two drive press jaw halves have, for example, lugs on both sides, which are each connected to the hollow pin and slide on the hollow pin during the pivoting movement. Since the hollow pin is continuous, in this embodiment the drive press jaw halves have an axis that is offset from the axis of the press insert.

In a preferred manner, the joint elements of the drive press jaw have two hollow bolts, wherein the hollow bolts are each connected on both sides with a retaining lug and wherein the hollow bolts support the drive press jaw halves so that they can pivot about the common axis. The hollow bolts each receive the lugs of the drive press jaw halves on one side. In addition, the hollow bolts can be arranged at a distance from each other in the area between the retaining lugs, so that the hollow bolt of the press insert can be arranged in the space between the two hollow bolts of the drive press jaw. Thus, both the press segments of the press insert and the drive press jaw halves of the drive press jaw are arranged on a common axis. Since both parts rotate around the same axis, the pressing process can be carried out with a power transmission by means of flat power transmission means and power transmission elements without sliding of the surfaces and thus without friction losses.

In a further preferred manner, the hollow pin supporting each two press segments of the press insert is arranged between the two hollow pins supporting the drive press jaw halves of the drive press jaw. A locking bolt is also preferably arranged in the hollow bolts as a common rotation axis. If the drive press jaw halves of the drive press jaw are driven to a pivoting movement by a press device, they transmit the pressing force to the press segments of the press insert, whereby the pivoting about the same common axis is carried out effectively and without frictional losses by force transmission surfaces sliding on each other.

The hollow bolts of the drive press jaw halves of the drive press jaw can be fixed both in the press jaw receptacle on the retaining lugs or in the drive press jaw halves of the drive press jaw. In the latter case, the hollow bolts in the drive press jaw are interchangeable.

Thus, the actuation behaviour of the coupled arrangement of the press jaw is the same as the standard press jaw. The synchronisation of the rotational movement of both drive press jaw halves of the drive press jaw and the press segments of the press insert is given by the joint having a common joint.

The coupling means and the coupling elements can enable both a form closure and a force closure. A form closure can be realized by the design described below as a T-groove and head pin or as a coupling pin and a recess. The force fit can be achieved, for example, by an arrangement of magnets which preferably exert an attractive force centering on the position to be achieved.

For a positive fit, in a preferred manner in a first embodiment, the coupling means includes coupling pins with head ends, wherein the coupling elements include partially opened T-grooves and receive the coupling means.

For this purpose, the T-grooves have undercuts on the open side towards both side walls, resulting in a rail. The coupling means of a press insert in the form of a head pin can then engage in the T-groove and be displaced therein without the head pin becoming disengaged. In addition, the coupling means can be formed in such a way that in the connected state there is a mechanical play between the coupling means and the coupling elements. In this embodiment, the press insert and the drive press jaw are coupled together, but at the same time can be easily displaced or pivoted and, if necessary, are suitable for sliding during the pressing process.

For this purpose, the head ends have a radius larger than the radius of the pin section. The coupling pin is thus suitable for undercutting a coupling element of the drive jaw. Such an undercut design is realized by the partially open T-groove of the coupling elements of the drive jaw, with which in each case a coupling pin can be slidably engaged with its head end.

A T-groove is understood to be a groove that has a rectangular section in cross-section corresponding to the T-crossbar and a section that is narrower and open at the bottom corresponding to the vertical T-dash. The directions below and above are only chosen as examples in order to draw a comparison with the letters "T".

The head of the head pin is located in the rectangular section of the T-crossbar and the pin section of the head pin runs in the vertical T-line. The head and the crossbar then result in a coupling essentially perpendicular to the orientation of the T-crossbar, which can only be released by sliding along the groove open on both sides.

In a second embodiment of the press jaw, the coupling elements have coupling pins and the coupling means have recesses and receive the coupling elements for establishing a positive fit.

For this purpose, the coupling elements preferably have coupling pins in the form of a solid cylinder with a constant radius and the recesses are shaped in such a way that the coupling elements engage in the recesses by contact, so that the drive press jaw and the press insert are detachably connected by means of the coupling elements and coupling means. The coupling pins are preferably provided on two opposing inner sides of the drive press jaw halves of the drive press jaw.

The recesses serving as coupling means can be arranged at two opposite locations on the outer sides of the press segments of the press insert, preferably completely in an area between the center of the press contour of the press insert and the joint means of the press insert, particularly preferably in a direction perpendicular to the horizontally aligned drive press jaw with connected press insert above and below the joint means of the press insert.

Preferably, the design of the recesses results in a projection which the coupling pins engage behind during the coupling process of the press insert with the drive press jaw, the coupling pins rest against the projection and fit positively into the grooves formed by the recesses.

This design of coupling elements and coupling means can reduce the number of parts to be produced in a system for pressing, as the coupling pins are only provided in the drive press jaw and the various press inserts or the pull insert only have recesses. This type of system is mechanically easier to manufacture. In addition, a reduction in the number of elements protruding from the component silhouette results in advantages in the handling of the press tool. The press tool and the individual parts of the system are more comfortable to grip and offer less potential for snagging in an operator's clothing.

As described above, the drive press jaw can have retaining tabs on both sides to hold and support the individual components together. A drive mechanism can also be connected to this, in particular in the form of a double roller plunger with two rollers, in order to form an operative connection with a press tool, in particular one that operates hydraulically or electrically. However, the drive of the drive press jaw halves can also be realized by a toggle lever.

Furthermore, the press insert can also have a spring, which is preferably formed as a torsion spring and compresses the press segments of the press insert. When the press segments of the press insert are coupled with the drive press jaw halves of the drive press jaw, the spring also causes the drive press jaw halves of the drive press jaw to be pressed together. This facilitates the assembly of the press jaw consisting of drive press jaw and press inserts on a fitting. To support this movement, such a spring can also be provided in the drive press jaw.

To couple the press insert with the drive press jaw, the latter can be brought together with the drive press jaw halves of the drive press jaw in a slightly pivoted position, whereby the coupling means, in particular the coupling pins, engage in the openings of the coupling elements, in particular the T-grooves. By turning back the press insert, the coupling pins engage in the undercut of the T-grooves. If, for example, the opening of the hollow pin of the press insert is then congruent with the locking pin arranged in one of the hollow pins of the drive press jaw, the locking pin can be pushed in.

The same coupling process can also be realized with the design of the coupling means as a recess and the coupling elements as a pin.

In principle, the press jaw can be used with one of the designs of the press insert described below and/or with one of the designs of the drive press jaw described below.

The above technical problem is solved according to a second teaching by a drive press jaw for pressing fittings with pipes by means of a press insert, with two drive press jaw halves, with joint elements for connecting the drive press jaw halves, with coupling elements for releasably connecting with a press insert and with force transmission elements, wherein the joint elements enable the drive press jaw halves to pivot about a common axis or about two different axes, wherein connecting elements are provided for pivotably connecting the press insert, and wherein the force transmission elements are arranged at least predominantly, preferably completely, in an area between the center of the press contour of the press insert to be connected and the joint means of the press insert to be connected.

The advantages of the various preferred embodiments already described for the press jaw apply in the same way to the drive press jaw, so that reference is made to the previous explanations at the relevant points.

In a preferred manner, the force transmission elements are formed as contact surfaces and the contact surfaces have an angle $\alpha$ greater than 10°, preferably greater than 25°, in particular greater than 40°, especially preferably greater than 80° to one another.

Furthermore, the connecting elements and the joint elements can have the same axis or axis of rotation.

Alternatively, the connecting elements and the joint elements can have different axes, whereby the joint elements enable the drive press jaw halves to pivot about a common axis or about different axes.

Furthermore, the coupling elements can have partially opened T-grooves for releasably receiving coupling means of the press insert, and the force transmission elements are formed as contact surfaces. Thus, the coupling elements enable the press insert to be held in a pivotable manner.

Alternatively, the coupling elements may have coupling pins. The coupling pins can thus engage with appropriately formed coupling means of a press insert and enable a pivotable holding of the press insert.

In addition, a spring, in particular a torsion spring, can be arranged in the drive press jaw, which pulls the drive press jaw halves together.

A design of the joint elements with at least one hollow pin connecting both drive press jaw halves can also be provided. In this case, the hollow bolts can each be connected to a retaining lug of the drive press jaw. In addition, the hollow bolts can support the drive press jaw halves so that they can pivot about the common axis and, if necessary, the hollow bolts can be arranged at a distance from each other in the area between the retaining lugs.

This drive press jaw therefore does not serve directly as a press jaw, but transmits a pressing force to the press insert connected to it. The design of the coupling elements is adapted to the coupling means of the press insert and enables a detachable connection. Thereby, the functions of coupling and force transmission are largely separated from each other, so that a special design is possible for both functionalities.

For this purpose, the coupling elements can have partially open T-grooves. For this purpose, the T-grooves have undercuts on the open side towards both side walls, resulting in a rail. The coupling means of a press insert in the form of a head pin can then engage in the T-groove and be displaced therein without the head pin becoming disengaged. Alternatively, coupling pins and recesses of the type described above may be provided.

The drive press jaw further has a common retaining structure, which is preferably formed as retaining tabs arranged on both sides for retaining and connecting the drive press jaw halves and the press segments of the press insert.

The coupling elements are furthermore formed in such a way that they partly enable a pivotable holding of the press insert. For this purpose, the joint means of the press insert is pivotably connected to the drive press jaw, preferably with the described lugs. Part of the coupling is effected by the rotatable and pivotable connection of the press insert.

Furthermore, it is preferred that the joint elements of the drive press jaw have a hollow pin connecting both drive press jaw halves. The two drive press jaw halves have lugs on both sides, which are each connected to the hollow pin and slide on the hollow pin during the pivoting movement. Since the hollow pin is continuous, in this embodiment the drive press jaw halves have a rotation axis that is offset from the axis of the press insert.

In a preferred manner, the joint elements of the drive press jaw have two hollow bolts, wherein the hollow bolts are each connected on both sides with a retaining lug and wherein the hollow bolts support the drive press jaw halves so that they can pivot about the common axis. The hollow bolts each receive the lugs of the drive press jaw halves on one side. In addition, the hollow bolts can be arranged at a distance from each other in the area between the retaining lugs, so that the hollow bolt of the press insert can be arranged in the space between the two hollow bolts of the drive press jaw. Thus, both the press segments of the press insert and the drive press jaw halves of the drive press jaw are arranged on a common axis. Since both parts rotate around the same axis, the pressing process can be carried out with a power transmission by means of flat power transmission means and power transmission elements without sliding of the surfaces and thus without friction losses.

To fix the hollow bolts to the common axis, a locking bolt is preferably used, which is inserted into the hollow bolts and held in position by a fixing means.

According to a third teaching, the aforementioned technical problem is solved by a press insert for pressing fittings with pipes, with at least two press segments, with press contours formed in the press segments, with joint means for connecting the press segments, with coupling means for releasably connecting with a drive press jaw and with force transmission means. The press insert thus initially has the function of a press jaw insert which can be connected to a drive press jaw described below. The press insert is further characterised in that the press segments include attachment means for attaching a pull jaw.

There are two possibilities of how the attachment means are arranged on the press insert relative to the joint means. On the one hand, the attachment means can be arranged in the area behind the center of the press contour as viewed from the joint means. Thus, the attachment means for the pull insert of a pull jaw are arranged where the press insert can be opened in order to be positioned on a fitting before pressing. The opened section is then compressed by the pull jaw and the fitting is pressed.

On the other hand, the attachment means can be arranged in an area between the center of the press contour and the joint means. For the definition of the area, reference is made to the arrangement explained above in connection with the press jaw. Thus, the attachment means are arranged between the center of the press contour and the joint means.

The attaching means are arranged on the outside of the press segments and the press insert can therefore not only be used as a press jaw insert for a connection with a drive press jaw but also as a press sling which can be attached to a fitting detached from the drive press jaw and then pressed by means of a pull jaw.

The press inserts are formed with the at least two press segments connected to each other via the joint means as a press jaw insert, which can be pressed on the one hand from the side of the joint means by the force transmission means and application of a force by the drive press jaw and on the other hand from the open closing side by means of the application means. In addition, a single press insert is easier to handle in terms of size, as the size and thus the weight of the individual press insert can be adapted to the respective press contour to be pressed.

In an advantageous manner, the press inserts with the respective press contour for a press dimension can be used both as a press jaw insert for a press jaw and as a press sling, which can then be pressed by a pull jaw. An aforementioned press sling can have two or more articulated press segments, which can also be referred to as a press jaw insert if there are two press segments and as a press sling or press chain if there are more than two press segments. In the following, the term press sling is generally used for this.

The attachment means in the press segments are preferably formed as recesses for receiving pull means of the pull jaw. The pull means can then engage in the recesses with correspondingly formed projections and press the press segments of the press insert together.

Furthermore, the recesses enable the pull means to be applied at at least two, preferably several different angles in relation to the axis of the pipe to be pressed. In this way, the pull jaw can be applied in cramped situations, in particular if it is not possible to apply the jaw at a right angle to the axis of the pipe to be pressed. Preferably, the recesses are rotationally symmetrical and the pull means are dome-shaped, so that attachment at any angle is possible.

Furthermore, in a preferred manner, as part of the coupling means, the joint means enable the press insert to be pivotally attached to a drive press jaw.

In addition, the joint means can be formed as a hollow pin supporting two press segments each. The two press segments are arranged on the hollow bolt and slide over its surface during rotation. The hollow pin feature allows the use of a locking pin of the drive press jaw by inserting the locking pin into the hollow pin and placing it therein.

Furthermore, the coupling means can have coupling pins which are provided with head ends. The head ends have a radius larger than the radius of the pin section. The coupling pin is thereby suitable to undercut an undercut formation of a coupling element of the drive jaw. Such an undercut formation can be, for example, a partially open T-groove of the coupling elements of the drive jaw, with which in each case a coupling pin can be slidably brought into engagement with its head end. In this case, it is advantageous if the coupling means are formed in such a way that, in the connected state, there is a mechanical play between the coupling means and the coupling elements. Thus, the coupling pins and the T-grooves can be coupled but easily displaced against each other for coupling and, if necessary, for sliding during the pressing process.

The coupling pins and the power transmission means are furthermore preferably arranged on the outside of the press segments in the area facing the joint means. In this way, the force is transmitted through the drive press jaw close to the joint axis of the press insert.

Alternatively, the coupling means may have recesses for releasably receiving coupling elements of the drive press jaw. The recesses are preferably arranged on the outside of the press segments in the area facing the joint means, particularly preferably in a direction perpendicular to an axis dividing the press insert into two press segments, above and below the joint means.

The force transmission means of the press insert are preferably formed as contact surfaces, so that the force transmission elements of the drive press jaw, which are correspondingly formed as contact surfaces, can transmit the force in a planar manner and, if necessary, slide thereon during pressing.

Furthermore, it is advantageous for the described press insert if an elastic spring is provided for closing the press segments. The spring can be formed as a torsion spring and closes the press insert both in its function as a press sling and in its function as a press jaw insert of the drive press jaw.

The spring preferably secures the press insert axially by means of a further hollow bolt provided, on which the press insert is preferably pivotably mounted. The spring can then preferably engage in the hollow bolt with at least half the wire thickness. Due to the axial securing by means of the spring, the press insert can be made particularly narrow, especially narrower in comparison to a press insert secured by means of external retaining rings. Overall, the above-described drive press jaw and the entire construction of the above-described press jaw can be formed to be more space-saving, which simplifies work in narrow places that are difficult to access.

The above technical problem is solved according to a fourth teaching by a system for pressing fittings with pipes with at least two press inserts and with a drive press jaw. The press inserts include at least two press segments, press contours formed in the press segments, joint means for connecting the press segments, coupling means for releasably connecting with the drive press jaw and force transmission means, wherein the at least two press inserts have different press contours. The drive press jaw includes two drive press jaw halves, joint elements for connecting the drive press jaw halves, coupling elements for releasably connecting with the press insert and force transmission elements. The system is characterised in that at least one press insert with attachment means for attaching a pull jaw and a pull insert are provided. The pull insert has two pull insert halves, joint means for connecting the pull insert halves, coupling means for releasably connecting with the drive press jaw, force transmission means and pull means formed opposite the joint means, wherein the coupling means and the force transmission means are arranged on the outside of the pull insert halves. The pull insert and the drive press jaw together form the pull jaw.

Thus, the system includes not only a set of press inserts and a drive press jaw, but also a pull insert for compressing the at least one press insert with attachment means for use as a press sling. In this system, the press inserts are on the one hand suitable as press jaw inserts for a drive press jaw. On the other hand, the press inserts can also be used as a press sling, which can then be compressed by means of the pull insert, whereby the pull insert can also be coupled to the drive press jaw with the same or corresponding coupling means.

In a preferred manner, the pull means enable to be attached in the attachment means at at least two, preferably several different angles in relation to the axis of the pipe to be pressed. Since the press inserts are used as a press sling in confined situations, pressing is simplified if it is possible to attach the pull means to the attachment means of the press insert at different angles.

In particular, the drive press jaw is formed according to one of the previously explained embodiments and/or the press insert is formed according to one of the previously explained embodiments.

DESCRIPTION OF THE INVENTION

In the following, the invention is explained by means of embodiments with reference to the drawing. The drawing shows FIG. 1*a*-*f* a schematic representation of an embodiment of a system for pressing fittings with pipes, FIG. 2*a*-*c* a first embodiment of a press jaw with a press insert and a drive press jaw, FIG. 3*a*-*b* the press jaw according to FIG. 2 during the coupling process of the press insert with the drive press jaw, FIG. 4*a*-*b* a drive press jaw of a press jaw according to FIG. 2, FIG. 5*a*-*d* a press insert of a press jaw according to FIG. 2, FIG. 6*a*-*d* a first embodiment of a pull insert, in particular for a system according to FIGS. 1*e* and *f*, FIG. 7*a*-*c* a second embodiment of a press jaw with a press insert and a drive press jaw, FIG. 8*a*-*c* the press jaw according to FIG. 7 in the opened state, FIG. 9*a*-*b* the press jaw according to FIG. 7 during the coupling process of the press insert with the drive press jaw, FIG. 10*a*-*b* a drive press jaw of a press jaw according to FIG. 7, FIG. 11*a*-*d* a press insert of a press jaw according to FIG. 7, FIG. 12*a*-*b* a third embodiment of a drive press jaw, FIG. 13*a*-*b* a press insert for a drive press jaw according to FIG. 12, FIG. 14*a*-*b* a pull insert for a drive press jaw according to FIG. 12 and FIG. 15 an embodiment of a system for pressing fittings with pipes.

DESCRIPTION OF THE INVENTION

In the following description of the various embodiments according to the invention, components and elements with the same function and the same mode of operation are given the same reference signs, even if the components and elements may differ in dimension or shape in the various embodiments.

In the following, embodiments of a system according to the invention for pressing fittings with pipes are first explained with the aid of schematic illustrations. Subsequently, details of press jaws, drive press jaws, press inserts and pull inserts according to the invention are discussed on the basis of various embodiments.

FIGS. 1a to 1f show schematic illustrations of various embodiments of a system according to the invention for pressing fittings with pipes.

In FIGS. 1a to 1d, a press jaw including a drive press jaw and a press insert is shown schematically, with rotatably and fixedly mounted axes being indicated in order to illustrate the mode of operation of the interaction of drive press jaw and press insert.

Figure 1B:
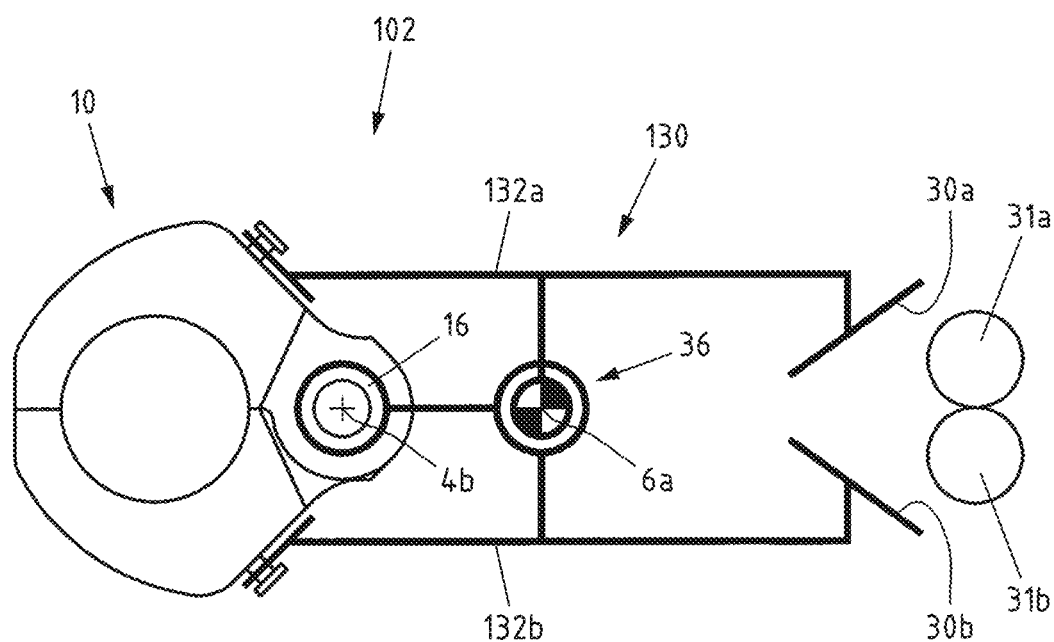
Figure 1C:
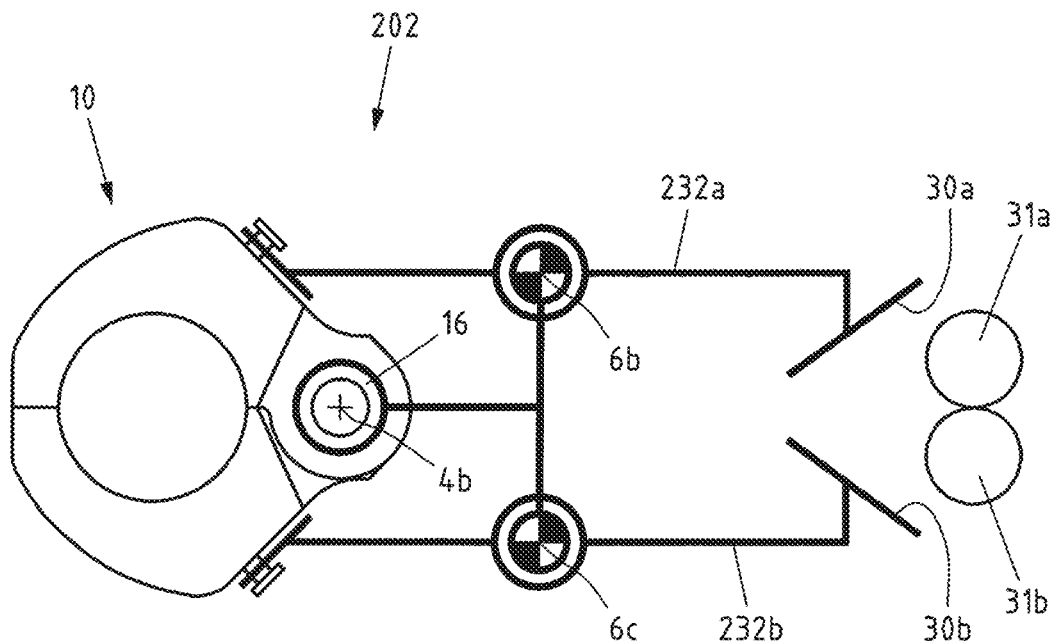
Figure 1D:
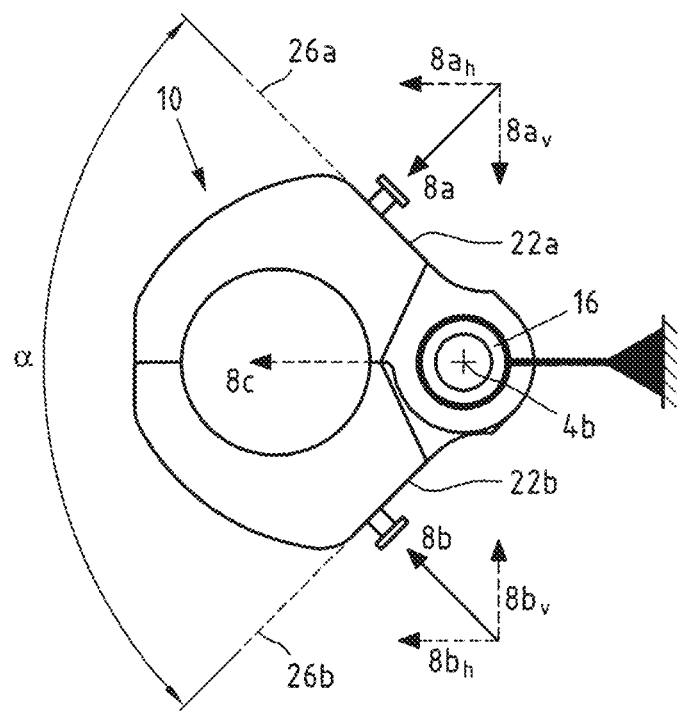

In addition, FIG. 1d shows the angle α of the contact surfaces to each other and the force effect of the force resultants during pressing is shown by means of a force diagram.

Figure 1E:
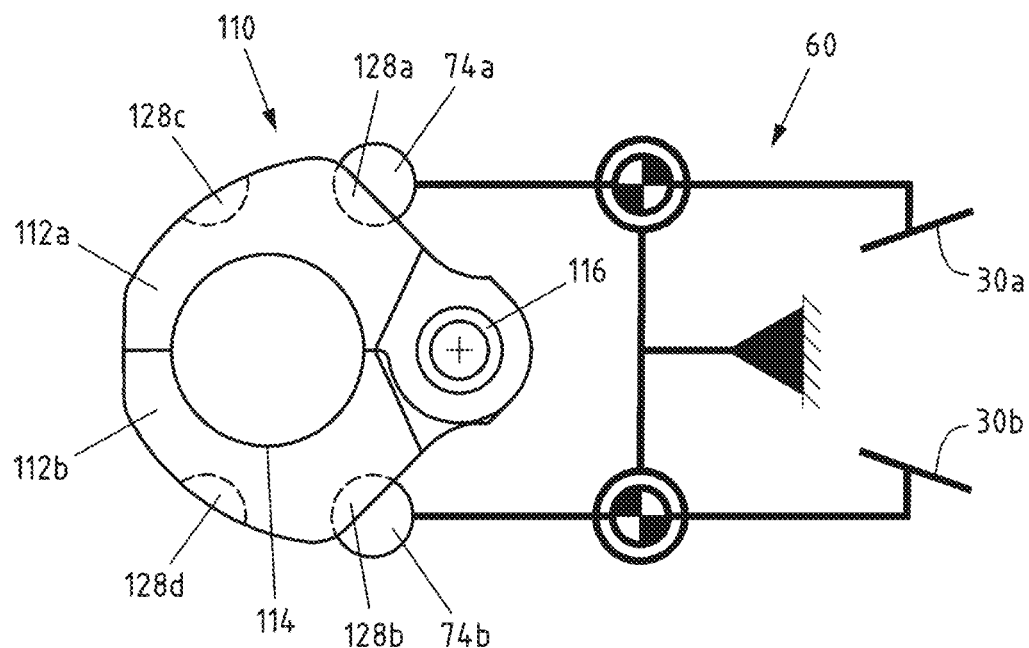
Figure 1F:
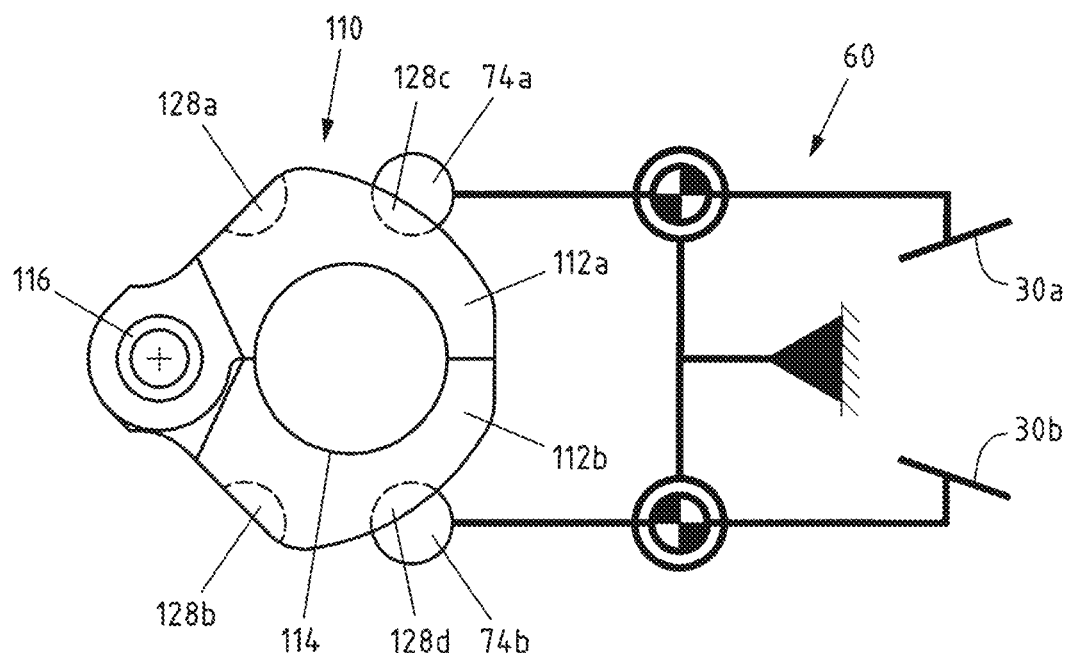

In FIGS. 1e and 1f, another press insert is shown and a pull jaw is also shown schematically in order to illustrate the functioning of the pull jaw in interaction with the press insert.

FIG. 1a first shows a first embodiment of a system 100 according to the invention for pressing fittings with pipes with a press jaw 2 including a press insert 10 with two press segments 12a, 12b, wherein a press contour 14 is formed in the press segments 12a, 12b, and further including a drive press jaw 30 with two drive press jaw halves 32a, 32b and joint elements 36. The press insert 10 includes coupling means 18a, 18b, via which the press insert 10 is detachably connected to the drive press jaw 30. Furthermore, the press insert 10 has joint means 16 for connecting the press segments 12a, 12b, wherein the joint means 16 furthermore pivotably connect the press insert 10 to the drive press jaw 30.

Furthermore, the press insert 10 has power transmission means 22 and the drive press jaw 30 has force transmission elements 42a, 42b (shown schematically), which in the present case are arranged entirely in an area between the center of the press contour 14 and the joint means 16. In the present view, the press jaw 2 is horizontally aligned with the drive press jaw 30 and the drive of the press tool runs horizontally. Only two rollers 31a, 31b of a double roller ram are shown engaging and cooperating with infeed contours 30a, 30b. As the rollers 31a, 31b are advanced, to the left in FIG. 1a, the drive press jaw halves 32a, 32b are forced apart so that the force transmission elements 42a, 42b and thus the press segments 12a, 12b are pressed together. This results in the pressing of a fitting.

The axis of the press contour 14 is perpendicular to the side view and perpendicular to the paper plane, whereby the center of the press contour 14 corresponds to the axis of the press contour 14 and thus to the axis of the pipe to be joined (not shown). The orientation of the axis of the joint means 16 of the press insert 10 is also perpendicular to the horizontal orientation of the press jaw 2 and perpendicular to the paper plane.

The area between the center of the press contour 14 and the joint means 16 then corresponds to the space between a plane extending in the drawing plane perpendicular to the axis of the press contour 14 and perpendicular to the horizontal direction and a plane extending in the drawing plane perpendicular to the axis of the joint means 16 and perpendicular to the horizontal direction. By means of the coupling means 42a, 42b of the press insert 10, which are coupled to the coupling elements 18a, 18b of the drive press jaw 30 and which in the present case are formed as contact surfaces 22a, 22b, the press insert 10 is actuated by a movement of the drive press jaw 30. The press insert 10 can be opened by pressing the drive press jaw halves 32a, 32b together, the movement of the drive press jaw halves 32a, 32b being limited by the abuttment of the ends of the drive press jaw halves 32a, 32b (shown schematically) which ends being mounted by means of the joint elements 36 and are positioned opposite each other.

In the embodiment of the press jaw 2 shown in FIG. 1a, the press insert 10 and the drive press jaw halves 32a, 32b are arranged to pivot about the same axis 4a. The two press segments 12a, 12b of the press insert 10 and the two drive press jaw halves 32a, 32b of the drive press jaw 30 rotate about the same axis 4a, the joint means 16 and the joint elements 36 are thus arranged to rotate and pivot on the same axis 4a.

FIG. 1b shows an embodiment of a press jaw 102 in which the press insert 10 and the drive press jaw halves 132a, 132b of the drive press jaw 130 are arranged to pivot about different axes 4b, 6a, the drive press jaw halves 132a, 132b having a same axis 6a. Thus, an embodiment of the press jaw 102 with two axes 4b, 6a is indicated.

FIG. 1c shows an embodiment of a press jaw 202 in which the press insert 10 and the drive press jaw halves 232a, 232b are arranged to pivot about different axes 4b, 6b, 6c, the drive press jaw halves having different axes 6b, 6c. Thus, an embodiment of the press jaw 202 with three axes 4b, 6b, 6c is indicated.

FIG. 1d shows a press insert 10, whereby the force transmission from a drive press jaw (not shown) to the press insert 10 is shown by means of two arrows 8a, 8b. This force transmission 8a, 8b runs at an angle to each other and both arrows 8a, 8b are divided in FIG. 1d in a force parallelogram into the horizontal components $8a_h$, $8b_h$ and the vertical components $8a_v$, $8b_v$.

The force generated by the force transmission means 22a, 22b and by the force transmission elements (not shown) of the drive press jaw and compressing the press insert 10 is formed by the two vertical components $8a_v$, $8b_v$. The two horizontal components $8a_h$, $8b_h$ result in a force 8c, from the position of the joint means 16, directed away from the schematically shown bearing of the press insert 10.

The force resultant 8c as a linear force component is balanced by the bearing of the press insert 10 relative to a drive press jaw (not shown). This leaves the vertical force components $8a_v$, $8b_v$ directed towards each other.

The force transmission means 22, which are formed as flat contact surfaces 22a, 22b, have an angle α relative to one another, the angle α being measured between two planes 26a, 26b associated with the contact surfaces 22a, 22b. An angle α of 0° means contact surfaces 22a, 22b arranged parallel to each other. An angle α of greater than 80° is shown here.

FIGS. 1e and 1f now show further elements of the system for pressing fittings with pipes with a press insert 110 having two press segments 112a, 112b, wherein a press contour 114 is formed in the press segments 112a, 112b and wherein the press segments 112a, 112b are connected to one another via joint means 116. The press insert 110 further includes attachment means 128a, 128b, 128c, 128d (128 in the following) for a pull jaw 60, so that by means of the pull means 74a, 74b of the pull jaw 60 (only schematically shown), a fitting can be pressed by compressing the press insert 110. FIGS. 1e and 1f show two possibilities of such pressing, in which the press insert 110 is used as a press loop. The press insert 110 is not supported or otherwise connected to the drive press jaw, as shown in FIGS. 1a to 1d.

First, FIG. 1e shows a press insert 110 with attachment means 128 in the form of recesses 128a, 128b arranged on the outside of the press segments 112a, 112b in front of the center of the press insert 110 as viewed from the joint means 116.

FIG. 1f shows a press insert 110 with attachment means 128 in the form of recesses 128c, 128d, which are arranged on the outside of the press segments 112a, 112b, viewed from the joint means 116, behind the center of the press insert 110. Thus, in this case, the attachment means 128 are located where the press insert 110 can be opened to be positioned on a fitting prior to pressing. The opened section is then compressed by the pull jaw 60 and the fitting is pressed.

The attachment means 128a, 128b can also be formed as coupling means cooperating with the coupling elements of a drive press jaw. In this case, the attachment means 128a, 128b serve to transmit force both when a press insert 110 is used in its function as a press jaw insert and when it is used in its function as a press sling.

Figure 2A:
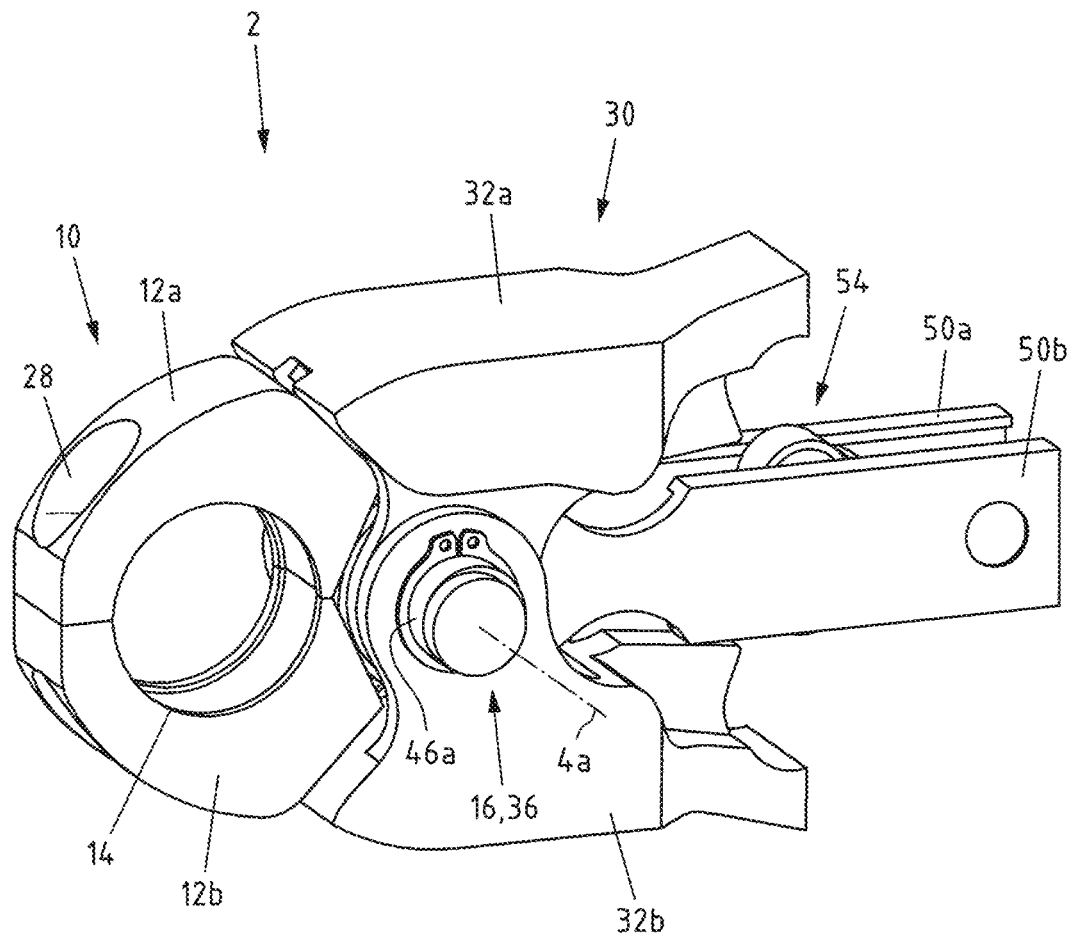
Figure 2B:
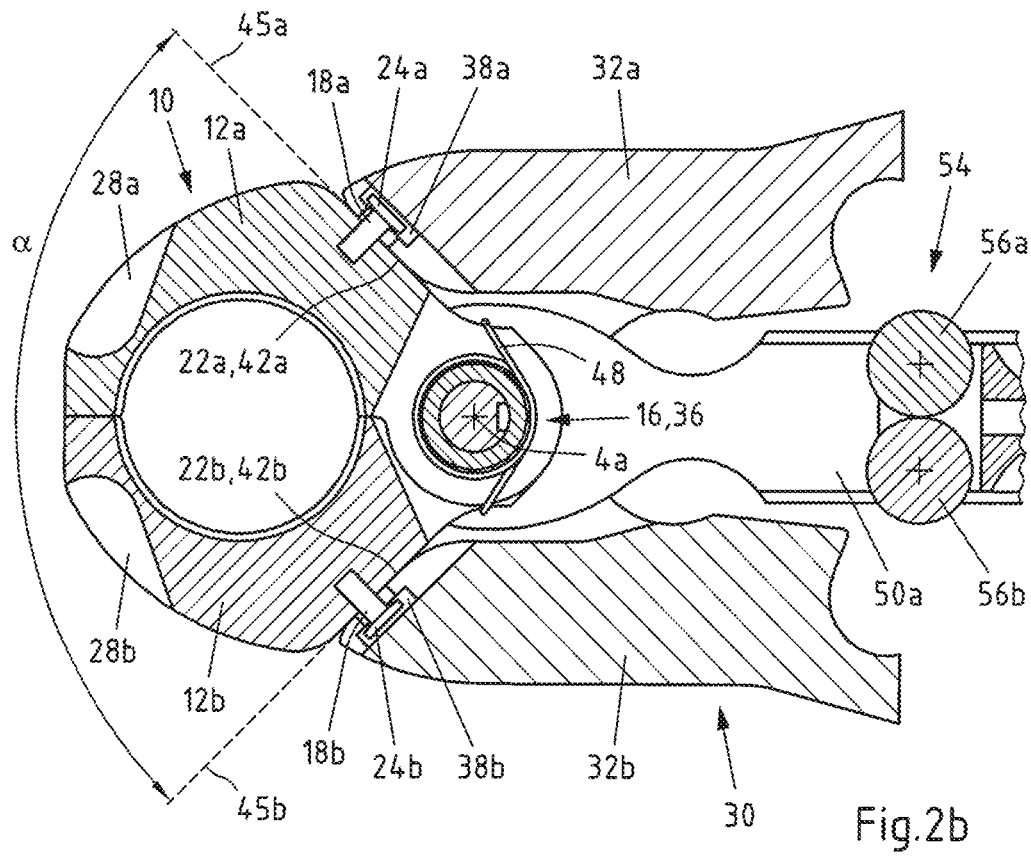
Figure 2C:
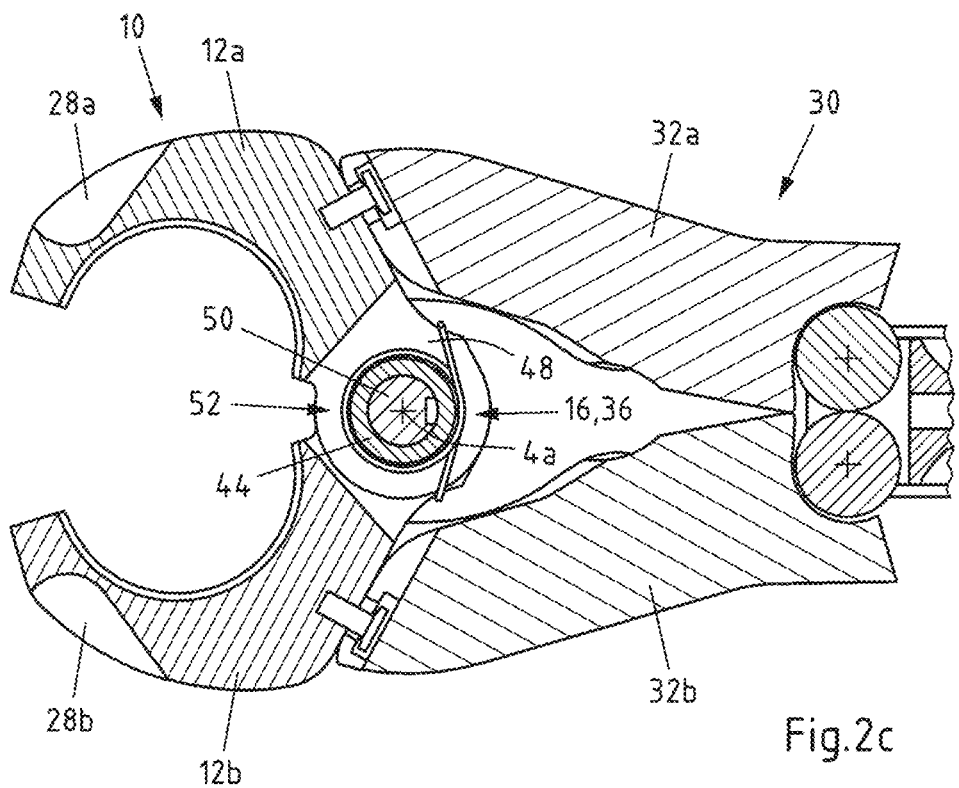

FIGS. 2a to 2c show a first embodiment of a press jaw 2 with a press insert 10 and a drive press jaw 30, in particular for a system according to FIG. 1a and FIG. 1d. FIG. 2a first shows the press jaw 2 in a perspective side view, FIG. 2b shows the press jaw 2 in a lateral sectional view in closed state and FIG. 2c in a lateral sectional view in open state.

The press jaw 2 has a press insert 10 and a drive press jaw 30 with joint elements 36 in the form of two hollow bolts 46a, 46b, which support the two drive press jaw halves 32a, 32b so that they can pivot about the common axis 4a. The hollow bolts 46a, 46b can also be seen in FIGS. 4a and 4b. Retaining lugs 50a, 50b are provided for retaining and connecting the drive press jaw halves 32a, 32b. A drive mechanism 54 in the form of a double roller plunger with two rollers 56a, 56b is connected to the retaining brackets 50a, 50b, whereby the drive mechanism 54 forms an operative connection with a press tool (not shown). The rollers 56a, 56b interact with an inlet contour of the drive press jaw halves 32a, 32b, which is not shown, as described above.

During pressing, the fitting to be pressed (not shown) is received and at least partially deformed by the press segments 12a, 12b or the press contour 14 of the press insert 10, the deformation being influenced by the design of the press contour 14. The two press segments 12a, 12b are connected to one another via joint means 16, the joint means 16 being in the form of a hollow pin 44 supporting both press segments 12a, 12b. An elastic spring 48 is used to close the press segments 12a, 12b.

The press insert 10 is coupled to the drive press jaw 30 by means of interlocking coupling means 18 in the form of coupling pins 18a, 18b with head ends 24a, 24b and coupling elements 38 in the form of partially open T-grooves 38a, 38b, the coupling pins 18a, 18b engaging in the coupled state in the undercuts formed by the T-grooves 38a, 38b. The force transmission elements 42 of the drive press jaw 30 are formed as abutment surfaces 42a, 42b which abut the force transmission means 22 of the press insert 10 formed as abutment surfaces 22a, 22b. When a fitting is pressed, the press insert 10 is compressed by the force generated by the press tool being transmitted to the press insert 10 via the force transmission elements 42 and the force transmission means 22.

Likewise, the contact surfaces 42a, 42b have an angle α relative to each other, the angle α being measured between two planes 45a, 45b associated with the contact surfaces 42a, 42b. An angle α of greater than 80° is shown. In the closed state of the drive press jaw 30 with coupled press insert 10 shown in FIG. 2b, it can be seen that the angle between the contact surfaces 22a, 22b corresponds to the angle between the contact surfaces 42a, 42b.

Due to the coinciding axes of rotation, the force transmission means do not slide on the force transmission elements in an advantageous manner during pressing, so that frictional losses are minimised or even avoided during the transmission of force from the drive press jaw 30 to the press insert 10. By omitting the sliding movement, the T-grooves 38a, 38b serving as coupling elements 38 can be made shorter compared to the shapes of T-grooves serving as coupling elements in press jaws in which sliding of the force transmission means on the force transmission elements occurs during pressing, so that the coupling process of the press insert 10 with the drive press jaw 30 is simplified.

In this embodiment, the press insert 10 and the drive press jaw 30 of the press jaw 2 can be pivoted about a common rotation axis 4a. For this purpose, a hollow pin 44 supporting both press segments 12a, 12b of the press insert 10 is arranged between the two hollow pins 46a, 46b supporting the drive press jaw halves 32a, 32b of the drive press jaw 30. A locking bolt 50 is further arranged in the hollow bolts 44, 46a, 46b as a common rotation axis 4a. The locking pin 50 thus serves to pivotally connect the press insert 10 to the drive press jaw 30 and also pivotally supports the drive press jaw halves 32a, 32b. The connecting elements 52, which pivotably connect the press insert to the drive press jaw 30, are therefore formed as hollow bolts 44, 46a, 46b and locking bolts 50.

Furthermore, the press insert 10 has attachment means 28 in the form of rotationally symmetrical recesses 28a, 28b, in which the pull means of a pull jaw 60 (see schematic in FIGS. 1e and 1f) can engage. The press insert 10 can thus also be used as a press loop. This makes it possible to press fittings in areas of the installation that are difficult to access, for example in room corners. This results in the advantageous design of the suitability of the press insert 10 both in connection with a drive press jaw 30 as a press jaw insert and also as a press loop in connection with a pull jaw 60, as shown in connection with FIGS. 1e and 1f.

Figure 3A:
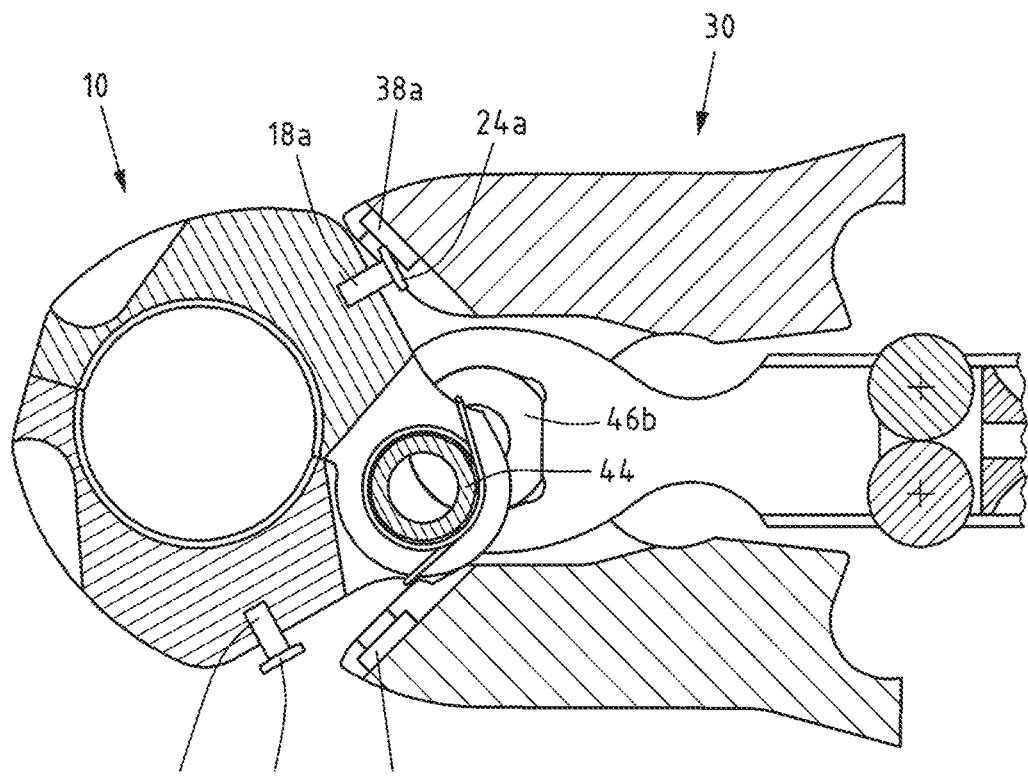
Figure 3B:
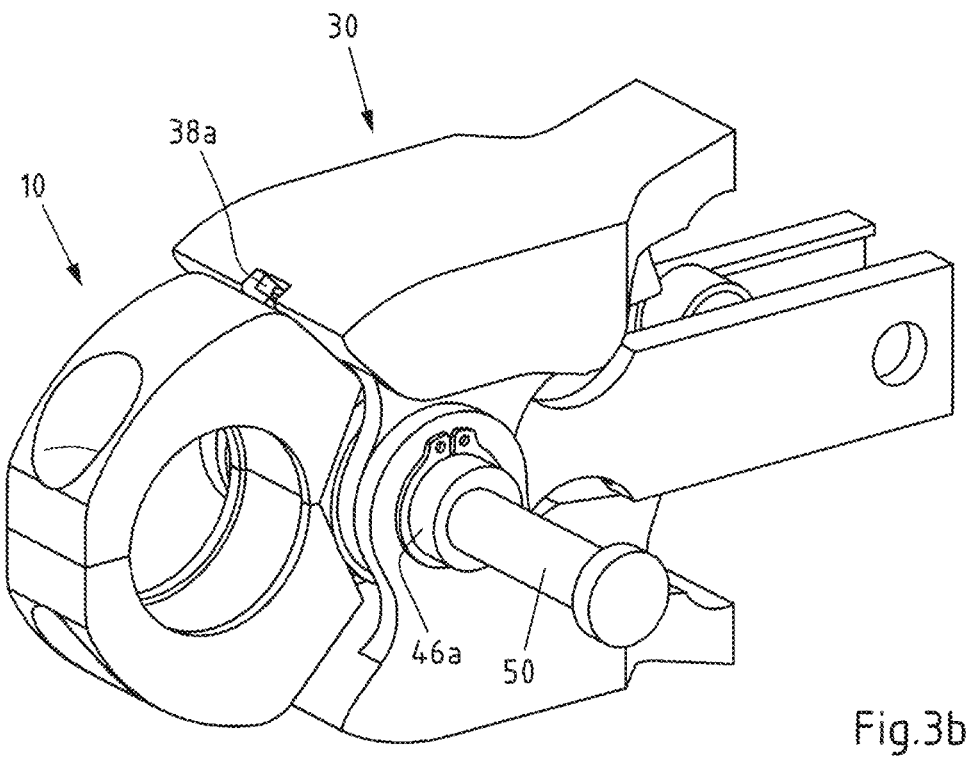

In FIGS. 3a and 3b, the press jaw according to FIGS. 2a-c is shown during the coupling process of the press insert 10 with the drive press jaw 30 in a lateral sectional view (FIG. 3a) and in a perspective view (FIG. 3b). First, the press insert 10 is inserted into the drive press jaw 30 in a slightly pivoted position so that the head ends 24a, 24b of the coupling pins 18a, 18b engage in the openings of the T-grooves 38a, 38b (FIG. 3a). By turning the press insert 10 back into the position of the drive press jaw 30 (shown horizontally in the present case), the coupling pins 18a, 18b engage in the undercut of the T-grooves 38a, 38b. If the opening of the hollow pin 44 is congruent with the openings of the hollow pins 46a, 46b of the drive press jaw 30, the locking pin 50 can be inserted.

Figure 4A:
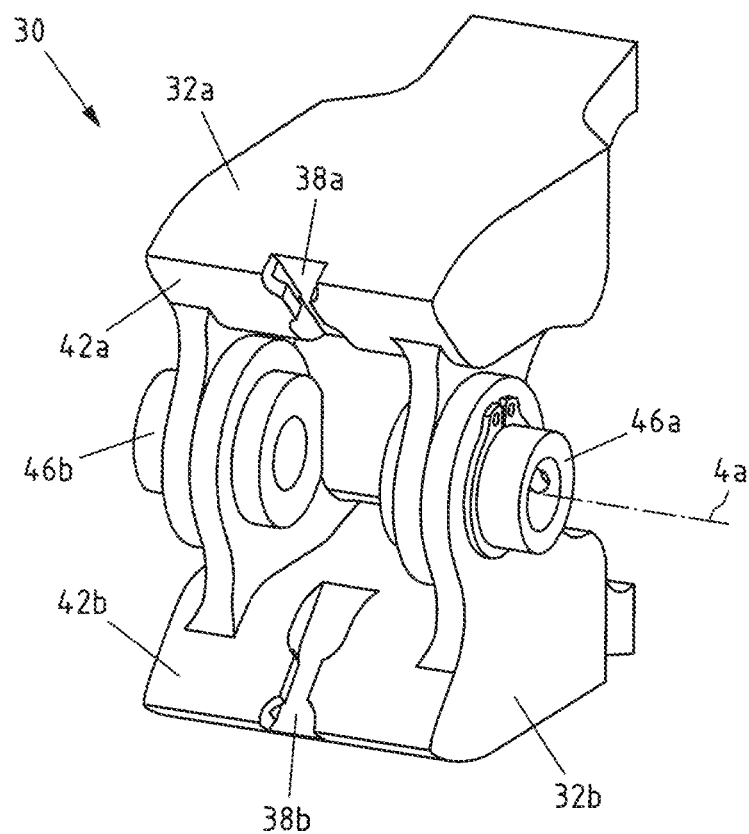
Figure 4B:
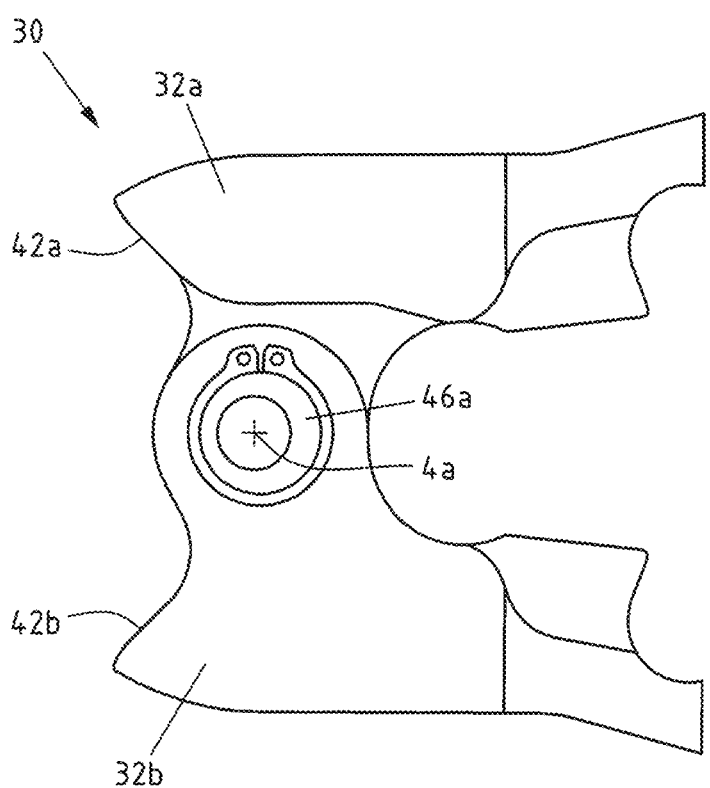

In FIGS. 4a and 4b a drive press jaw 30 of a press jaw 2 according to FIG. 2 is shown in a perspective view and in a side view. The locking pin 50 (shown in FIG. 2 and FIG. 3), which is arranged as a common rotation axis 4a, is enclosed both by the hollow pins 46a, 46b of the drive press jaw halves 32a, 32b and by the retaining lugs 50a, 50b (see FIG. 2).

The drive press jaw halves 32a, 32b each have undercut recesses in the form of a partially open T-groove 38a, 38b as coupling elements 38. The head ends 24a, 24b of the coupling pins 18a, 18b of the press insert 10, which have a larger radius than the radius of the pin section, can engage behind the undercuts, so that in the connected state there is a mechanical play between the coupling pins 18a, 18b and the T-grooves 38a, 38b. This enables the press insert 10 and the drive press jaw 30 to slide easily against each other during pressing. The force transmission elements 42 are formed as flat contact surfaces 42a, 42b.

Figure 5C:
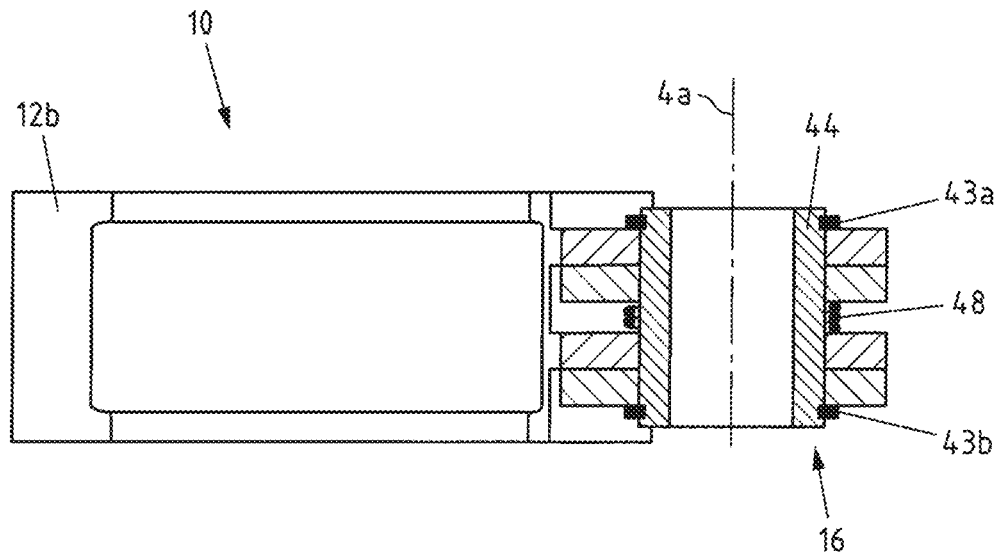
Figure 5D:
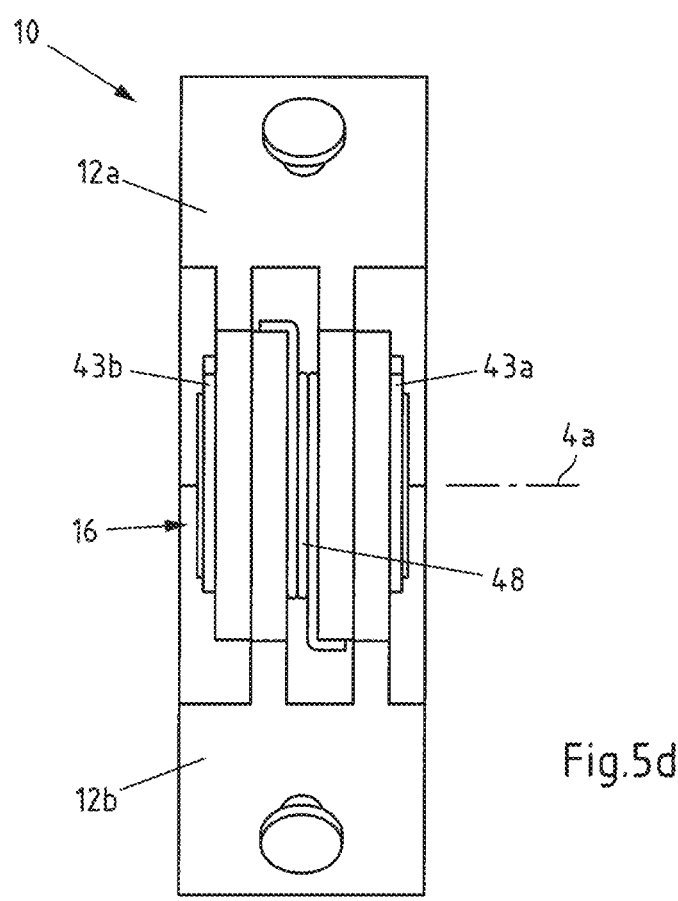

FIGS. 5a to 5d show a press insert 10 of a press jaw according to FIG. 2, wherein FIG. 5c shows a sectional view through the sectional axis Vc indicated in FIG. 5b and wherein FIG. 5d shows the top view of the side of the press insert 10 having the joint means 16 indicated in FIG. 5b by the direction Vd.

In the view shown in FIGS. 5a and 5b, the force transmission means 22 of the press insert 10, formed as contact surfaces 22a, 22b, are clearly visible. These contact surfaces 22a, 22b and the force transmission elements 42 of the drive press jaw 30 in FIG. 4, which are also formed as contact surfaces 42a, 42b, enable a two-dimensional force transmission independent of the coupling. Furthermore, the design as partially open T-grooves 38a, 38b enables a particularly smooth insertion of the press insert 10 into the drive press jaw 30 and thus simplifies the handling of the press tool.

With reference to the illustration shown in FIGS. 5c and 5d, the spring 48 is shown which pulls the press segments 12a, 12b of the press insert 10 against each other and thus serves to close the press insert 10. Retaining rings 43a, 43b are provided to secure the hollow bolt 44 axially.

Figure 6A:
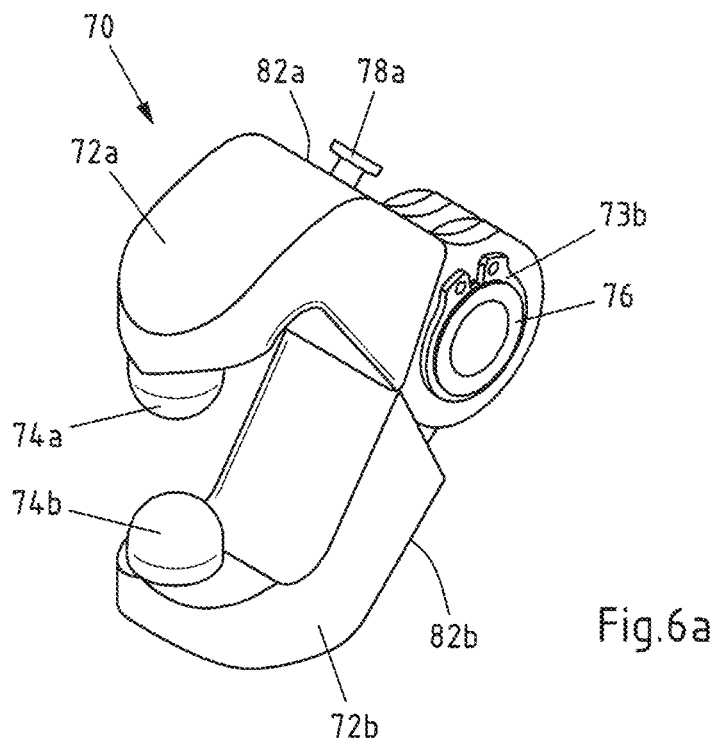
Figure 6B:
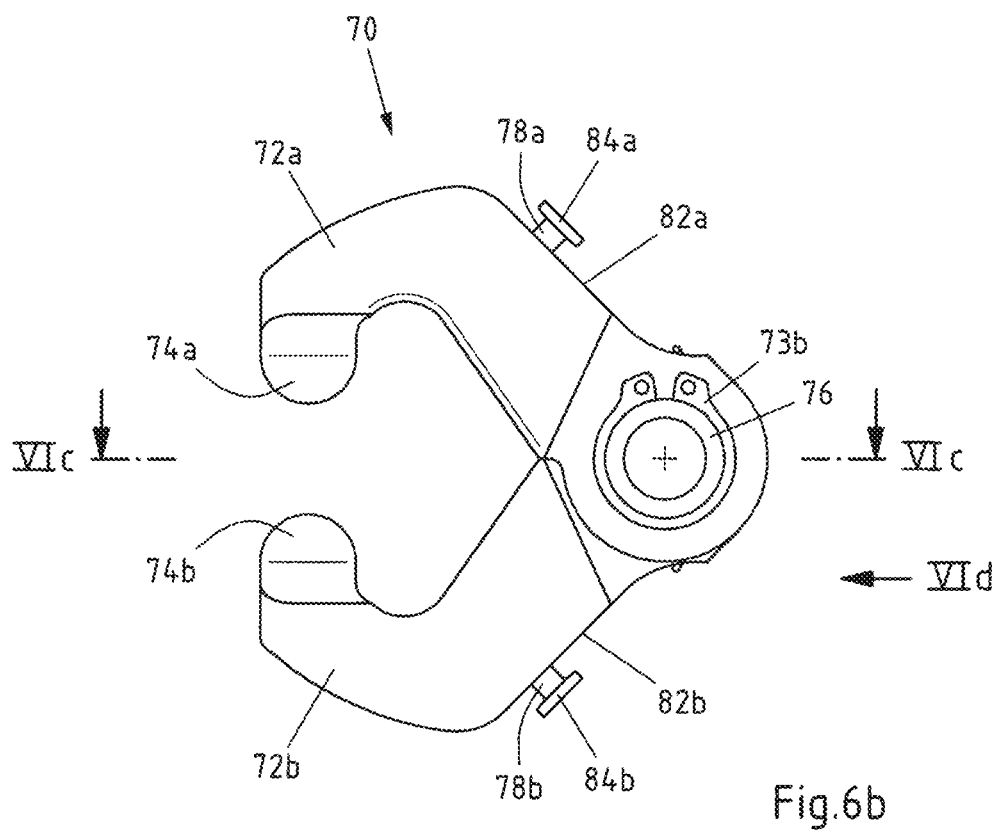
Figure 6C:
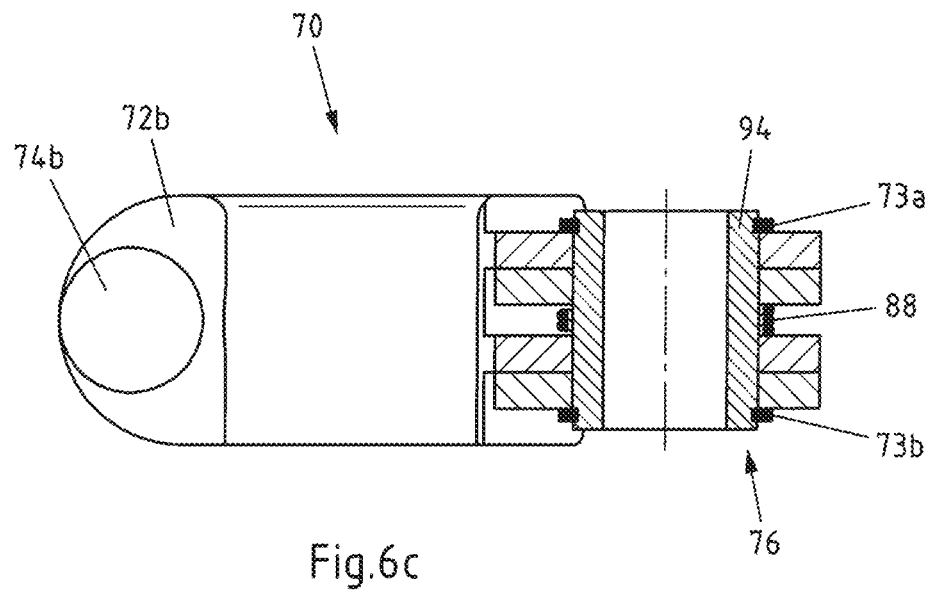
Figure 6D:
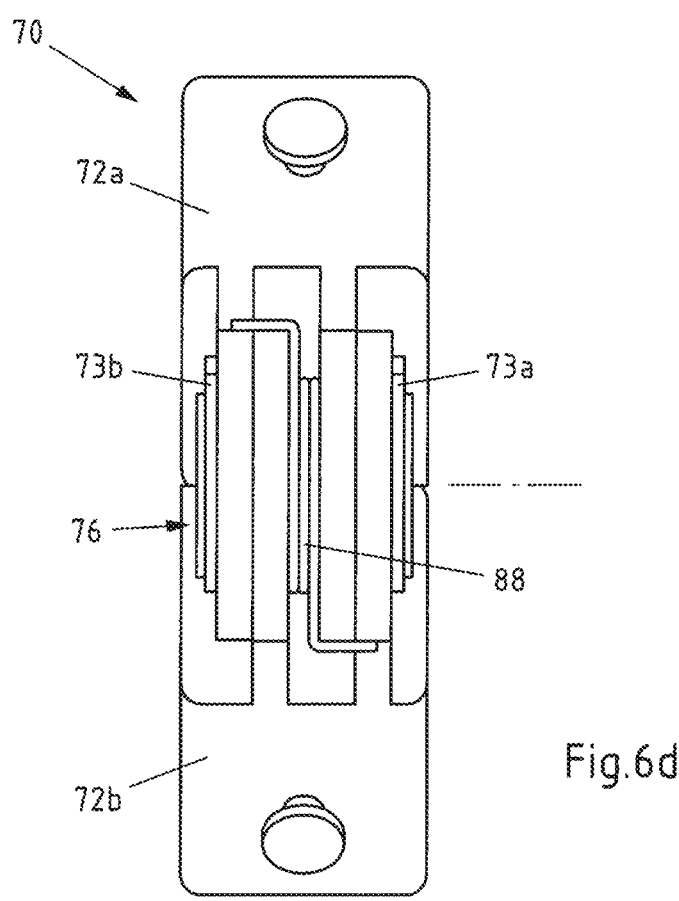

FIGS. 6a to 6d show a first embodiment of a pull insert 70, in particular for a system according to FIG. 1e and FIG. 1f, wherein FIG. 6c shows a sectional view through the sectional axis VIc drawn in FIG. 6b and wherein FIG. 6d shows the top view of the side of the pull insert 70 having the joint means 76 indicated from direction VId in FIG. 6b. The joint means 76 serve to connect the pull insert halves 72a, 72b. Furthermore, coupling means 78, here in the form of coupling pins 78a, 78b with head ends 84a, 84b, are provided for coupling the pull insert 70 to a drive press jaw 30 (not shown in FIG. 6). Thus, the pull insert 70 and the drive press jaw 30 act together as one pull jaw 60, as shown schematically in FIGS. 1e and 1f. Power transmission means 82, here in the form of contact surfaces 82a, 82b, are also provided on the outside of the pull insert halves 72a, 72b. The pull insert halves 72a, 72b each have pull means 74a, 74b formed opposite the joint means 76, which engage in the attachment means 28 of a press insert 10 (not shown in FIG. 6). The pull insert 70 and the drive press jaw 30 thus act together as a pull jaw 60 (see schematic FIGS. 1e and 1f) and press the press insert 10 radially inwards. In this case, the press insert 10 serves as a press loop and pressing of fittings in working areas that are difficult to access or spatially limited is simplified.

The force transmission means 82 of the pull insert 70, which are formed as contact surfaces 82a, 82b, together with force transmission elements of a drive press jaw (not shown), which are also formed as flat contact surfaces, enable a two-dimensional force transmission, which is independent of the coupling of the pull insert 70 with the drive press jaw 30. The coupling of the pull insert 70 with the drive press jaw 30 can be carried out in the same way as the coupling of a press insert 10 with a drive press jaw 30.

The joint means 76 are formed as a hollow pin 94 which pivotally supports the two pull insert halves 72a, 72b. A spring 88 serves to close the pull insert 70 by pulling the two pull insert halves 72a, 72b against each other. Retaining rings 73a, 73b are provided to secure the hollow bolt 94 axially.

Figure 7A:
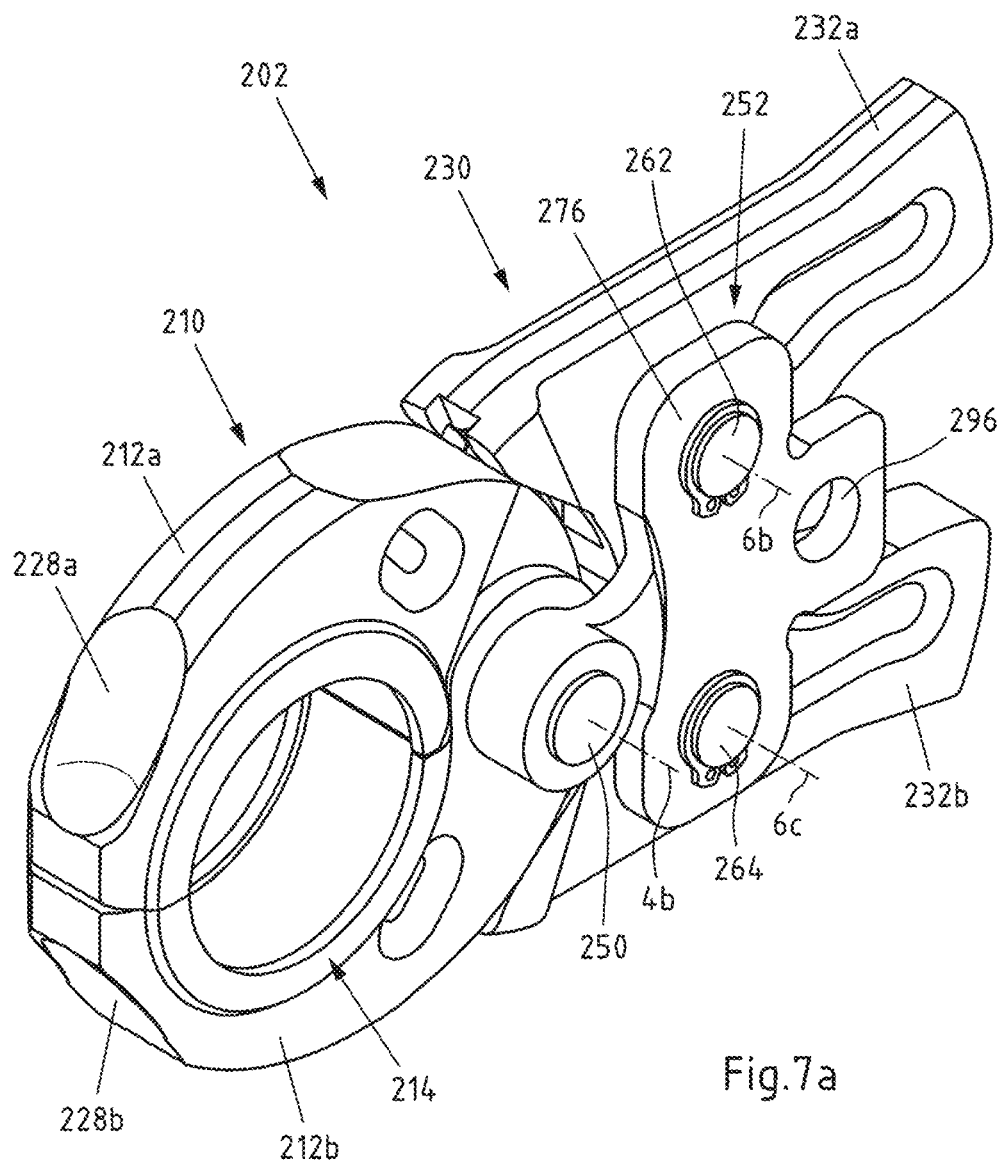
Figure 7B:
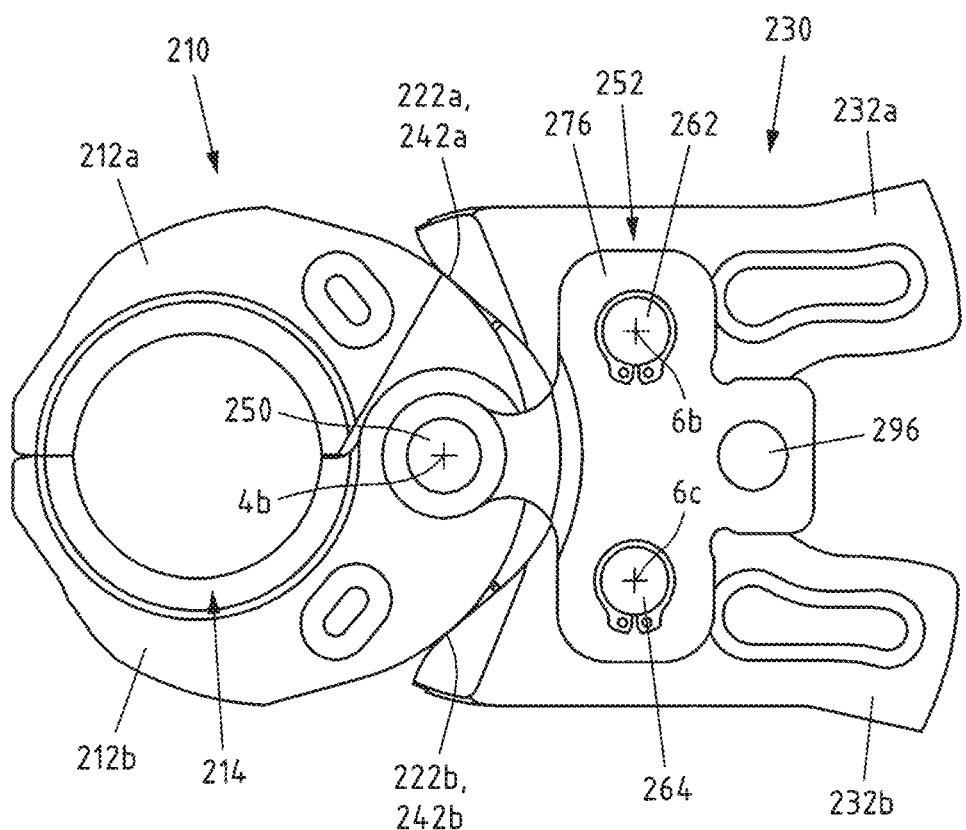
Figure 7C:
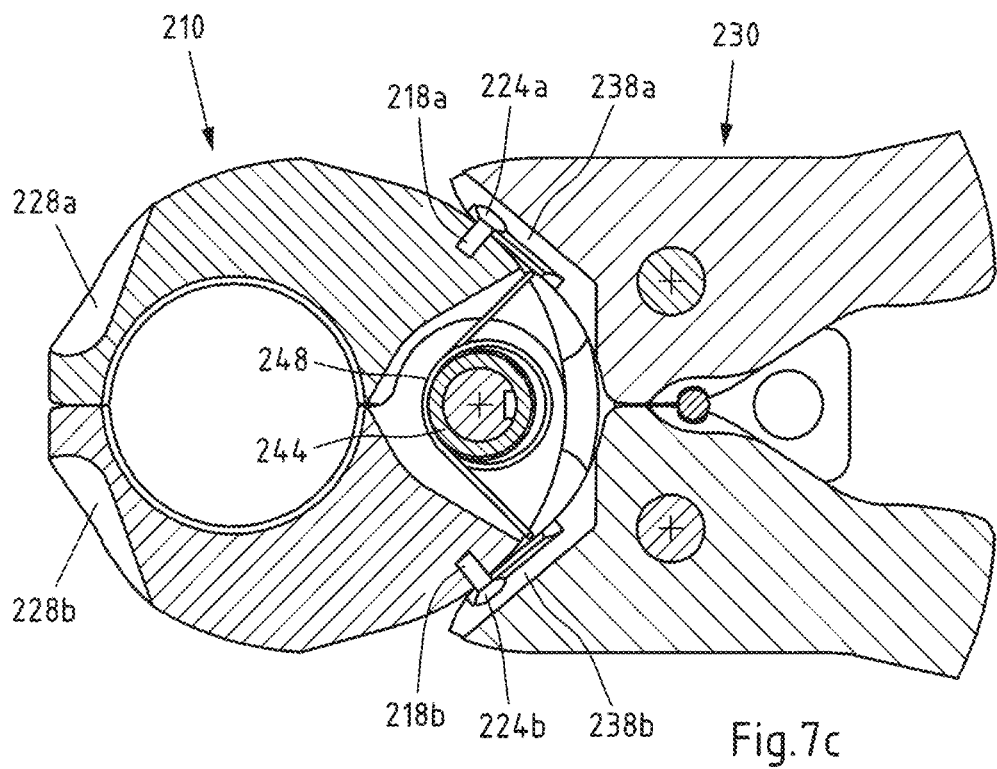

FIGS. 7a to 7c show a second embodiment of a press jaw 202 with a press insert 210 and a drive press jaw 230 with two drive press jaw halves 232a, 232b, in particular for a system according to FIG. 1c, in closed state. FIG. 7a shows a perspective view of the press jaw 202, whereas FIG. 7b shows a lateral view and FIG. 7c a lateral sectional view.

In contrast to the embodiment shown in FIG. 2, the press jaw 202 here has different rotation axes 4b, 6b, 6c for the press insert 210 and the drive press jaw halves 232a, 232b, with the drive press jaw halves 232a, 232b having different axes 6b, 6c. This embodiment thus has three axes of rotation 4a, 6b, 6c. The drive press jaw halves 232a, 232b and the press insert 210 are connected by means of a side plate 276 serving as a connecting element 252, wherein the further bearing eye 296 of the side plate 276, which is shown empty here, serves for connection to a press tool (not shown).

By providing different axes around which the press insert 210 and the drive press jaw halves 232a, 232b are pivotably mounted, the overall thickness of the press jaw 202 can be reduced and the overall construction can be made simpler. Due to the simpler design, the production of the drive press jaw 230 is less complex and thus more cost-effective.

In this embodiment of a press jaw 202, the press insert 210 also has press segments 212a, 212b or rather a press contour 214 for receiving the fitting to be pressed. The two press segments 212a, 212b are connected to each other via joint means 216, wherein the joint means 216 are formed as a hollow bolt 244 supporting both press segments 212a, 212b and axially secured by means of a spring 248. The spring 248 engages with at least half the wire thickness in the central groove 245 of the hollow bolt 244, as shown in the enlarged section of FIG. 11c and explained further below.

In this way, the joint of the press insert 210 can be narrow, in particular narrower than in the case of comparable securing with the aid of retaining rings as in the previously described embodiments of a press insert 10 according to FIG. 5. Due to the resulting narrow width of the joint, the gap between the drive press jaw halves, in which the press insert 210 is held in bearings, is also correspondingly narrow. Overall, the entire construction can thus be formed to be more space-saving, making it easier to work in narrow places that are difficult to access.

The spring 248 additionally pulls the two press segments 212a, 212b against each other. Furthermore, the press insert 210 has rotationally symmetrical recesses 228a, 228b as attachment means by means of which the press insert 210 can be used as a press sling in conjunction with a pull jaw 60 (see schematic in FIGS. 1e and 1f). A locking bolt 250 secures the pivotable mounting of the press insert 210 on the hollow bolt and at the same time serves to secure the connection with the drive press jaw 230 via the side plate 276. The drive press jaw halves 232a, 232b are connected to the side plate 276 by means of locking bolts 262, 264 and are pivotably mounted.

The press insert 210 also has coupling means 218 in the form of coupling pins 218a, 218b with head ends 224a, 224b and the drive press jaw 230 has coupling elements 238 in the form of partially open T-grooves 238a, 238b. The force transmission elements 242 of the drive press jaw 230 are formed as abutment surfaces 242a, 242b which abut on the force transmission means 222 of the press insert 210 formed as abutment surfaces 222a, 222b.

When a fitting is pressed, the press insert 210 is compressed by transmitting the force generated by the press tool (not shown) to the press insert 210 via the force transmission elements 242 and the force transmission means 222.

In the present case, the shape of the press insert 210 differs from the press inserts 10, 110 described above in that the portions of the outside of the press segments 212a, 212b which lie between the coupling means 222 are of round construction, so that these portions of the press segments 212a, 212b lie on the radius of a common circle in the closed state of the press insert 210.

Figure 8A:
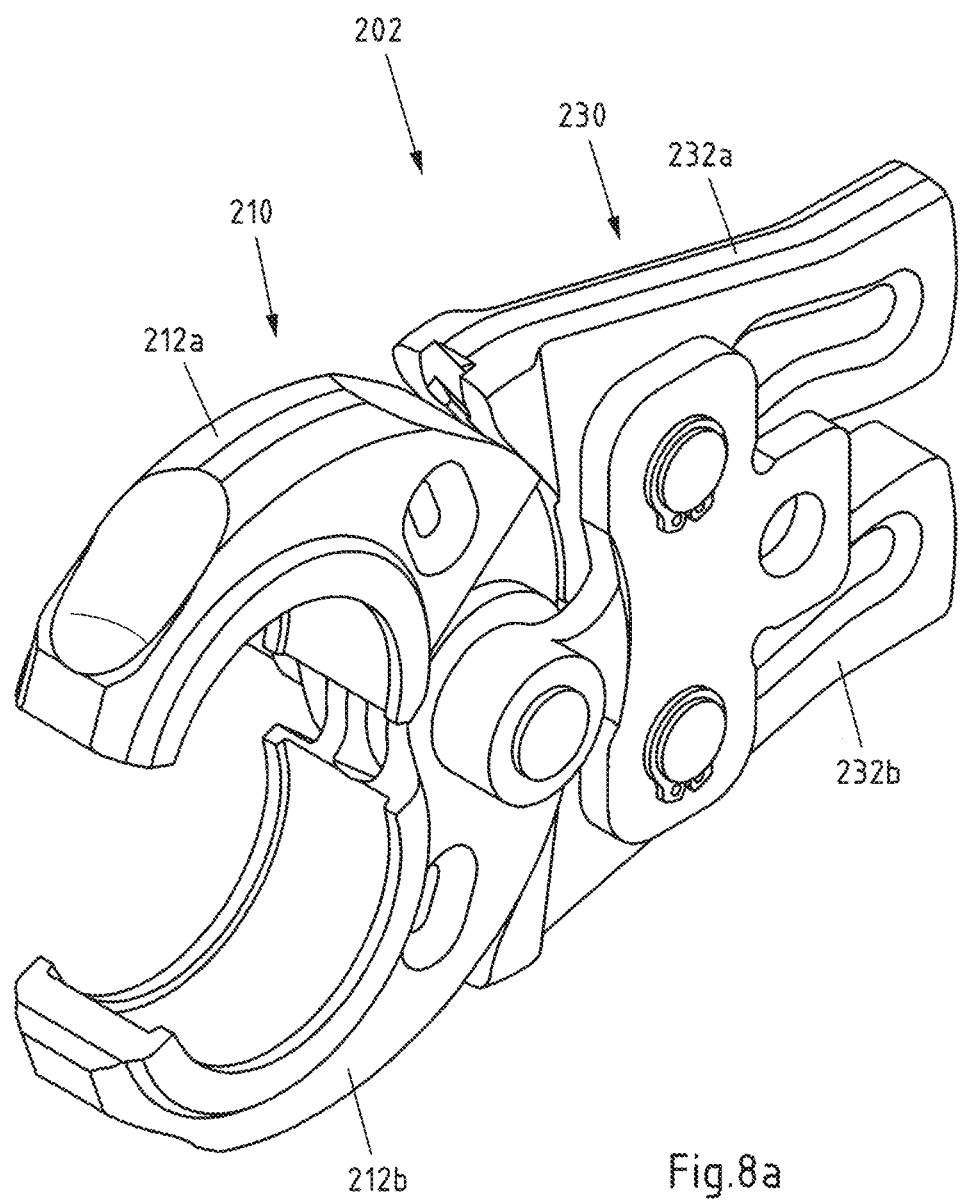
Figure 8B:
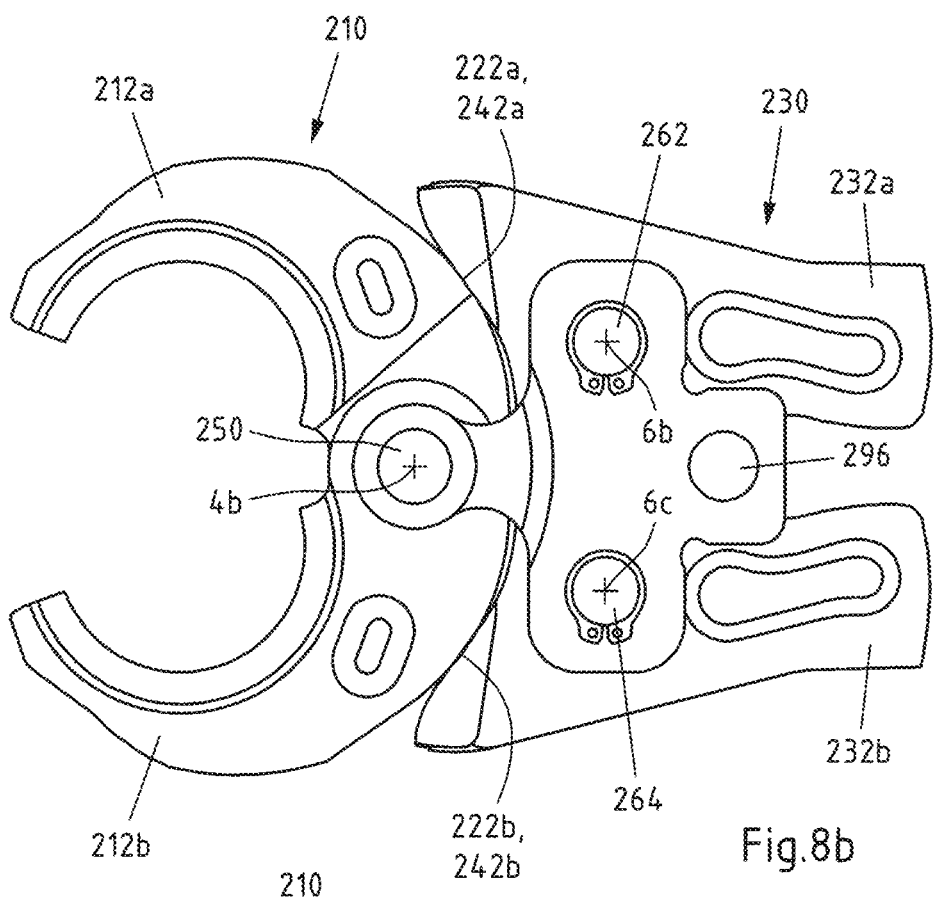
Figure 8C:
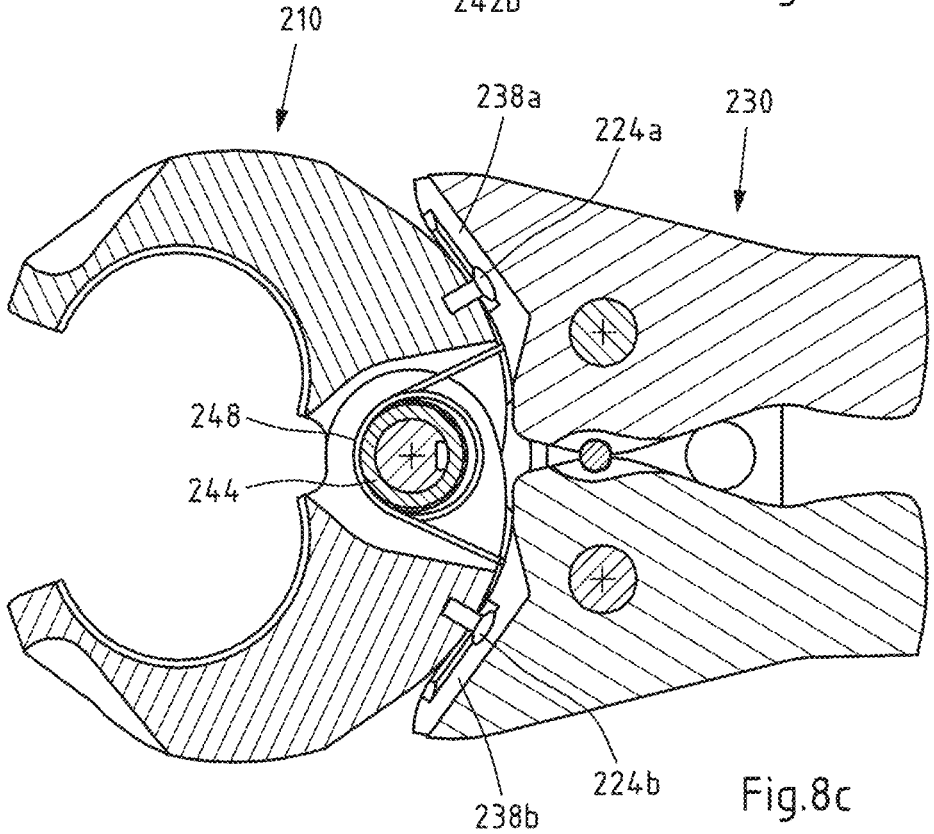

In FIGS. 8a to 8c, the press jaw 202 according to FIG. 7 is shown in an open state, whereby FIG. 8a shows a perspective view, FIG. 8b a lateral view and FIG. 8c a lateral sectional view. Opening of the press jaw 202 and thus of the press insert 210, so that a fitting to be pressed can be enclosed with the press insert 210, is achieved by pressing together the rear ends (pointing away from the press insert 210) of the drive press jaw halves 232a, 232b.

Figure 9A:
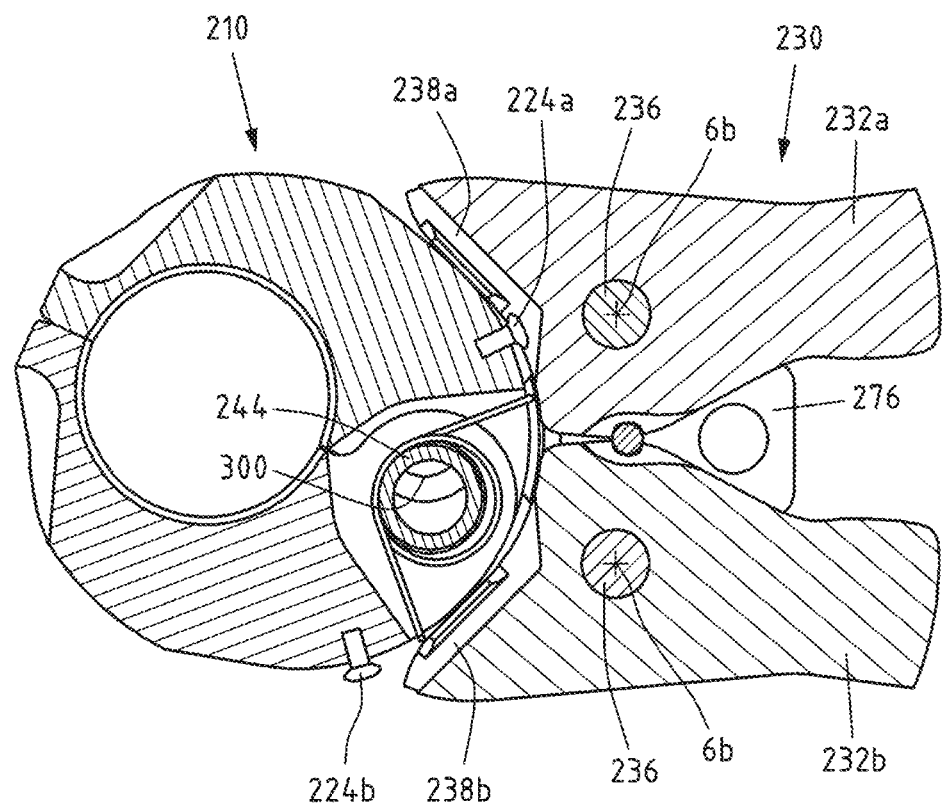
Figure 9B:
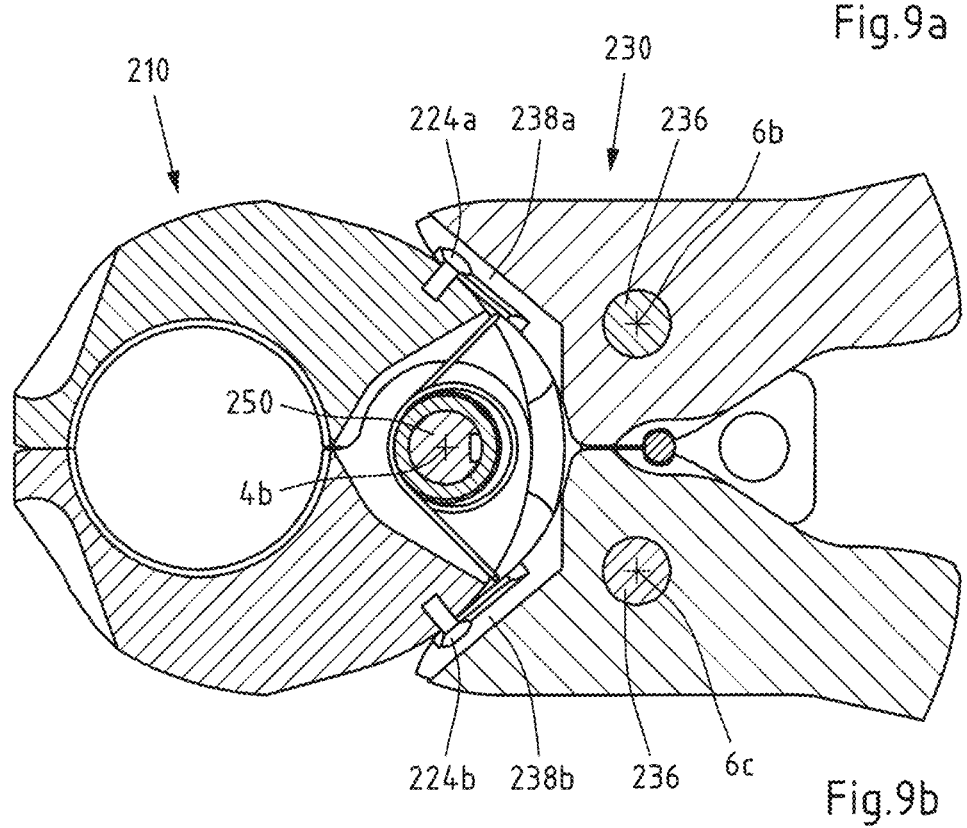
Figure 10A:
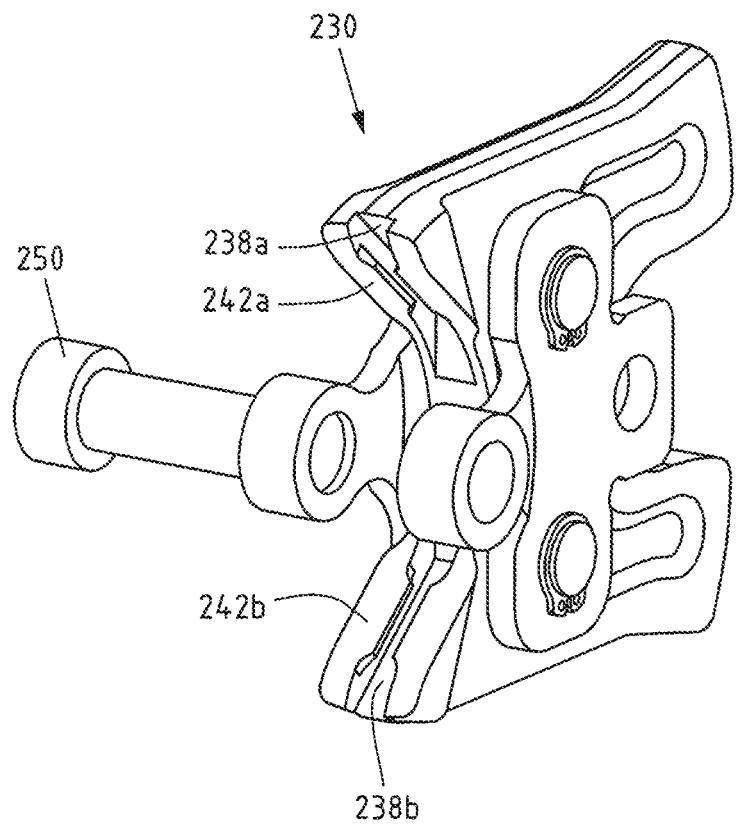
Figure 10B:
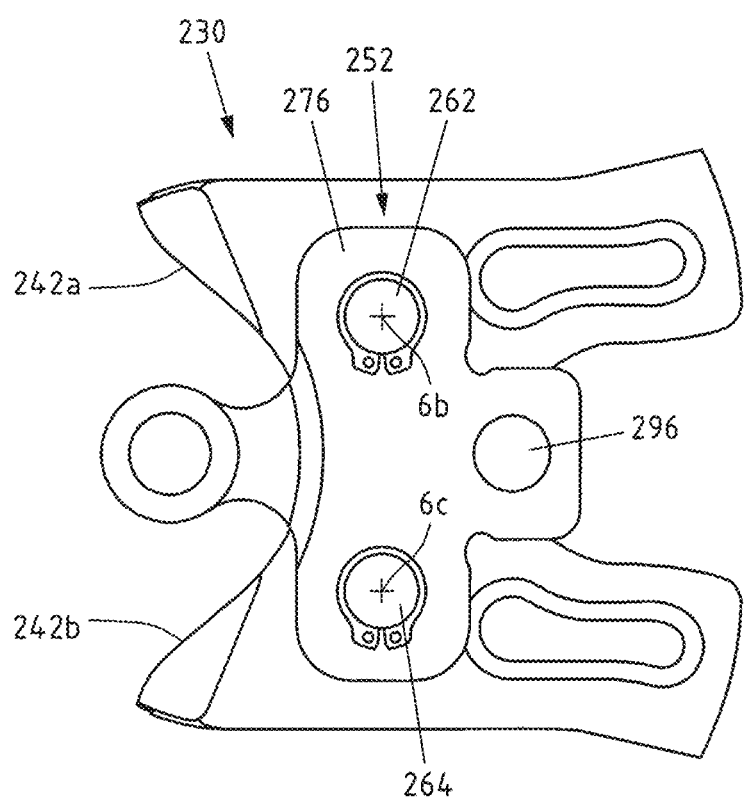

FIGS. 9a and 9b now show, in combination with FIGS. 10a and 10b, the press jaw 202 according to FIGS. 7a to 7c during the coupling process of the press insert 210 with the drive press jaw 230. In FIGS. 10a and 10b, the drive press jaw 230 according to FIGS. 7a to 7c is shown without the inserted press insert 210 in a perspective view and in a lateral view.

The joint elements 236 connect the drive press jaw halves 232a, 232b and enable the drive press jaw halves 232a, 232b to pivot about different axes 6b, 6c.

The round shaped portions of the press segments 212a, 212b, between the coupling means 218 of the press insert 210, enable the pivoting movement of the press insert 210 to couple the coupling means 218 into the coupling elements 238 to occur on a circular path without first pivoting the press insert 210 from the horizontal position of the drive press jaw 230. Such handling is easier for a user to implement, thereby improving the coupling of the press insert 210 into the drive press jaw 230.

If the opening of the hollow pin 244 of the press insert 210 is congruent with the bearing eye 300 of the side plate 276 provided for the bearing of the press insert 210 (FIGS. 10a and 10b), the locking pin 250, which represents the rotation axis 4b of the press insert 210, can be inserted to secure the connection between the press insert 210 and the drive press jaw 230.

According to FIG. 10a and FIG. 10b, the drive press jaw 230 has coupling elements 238 in the form of partially open T-grooves 238a, 238b having undercuts and further has force transmission elements 242 in the form of contact surfaces 242a, 242b. In this case, the T-grooves 238a, 238b are longer than the T-grooves 38a, 38b in order to ensure coupling of the press insert 210 during the entire opening movement of the drive press jaw 230.

Figure 11A:
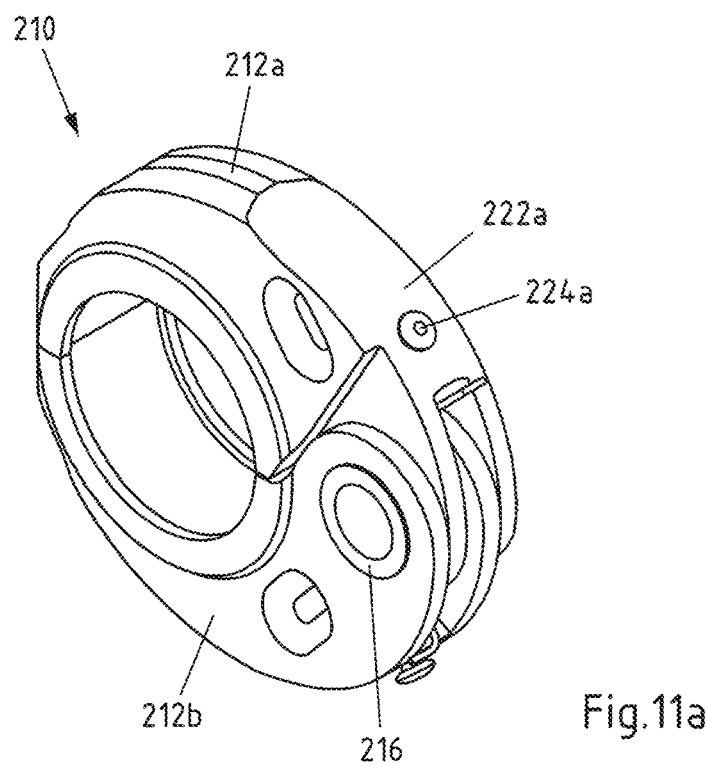
Figure 11B:
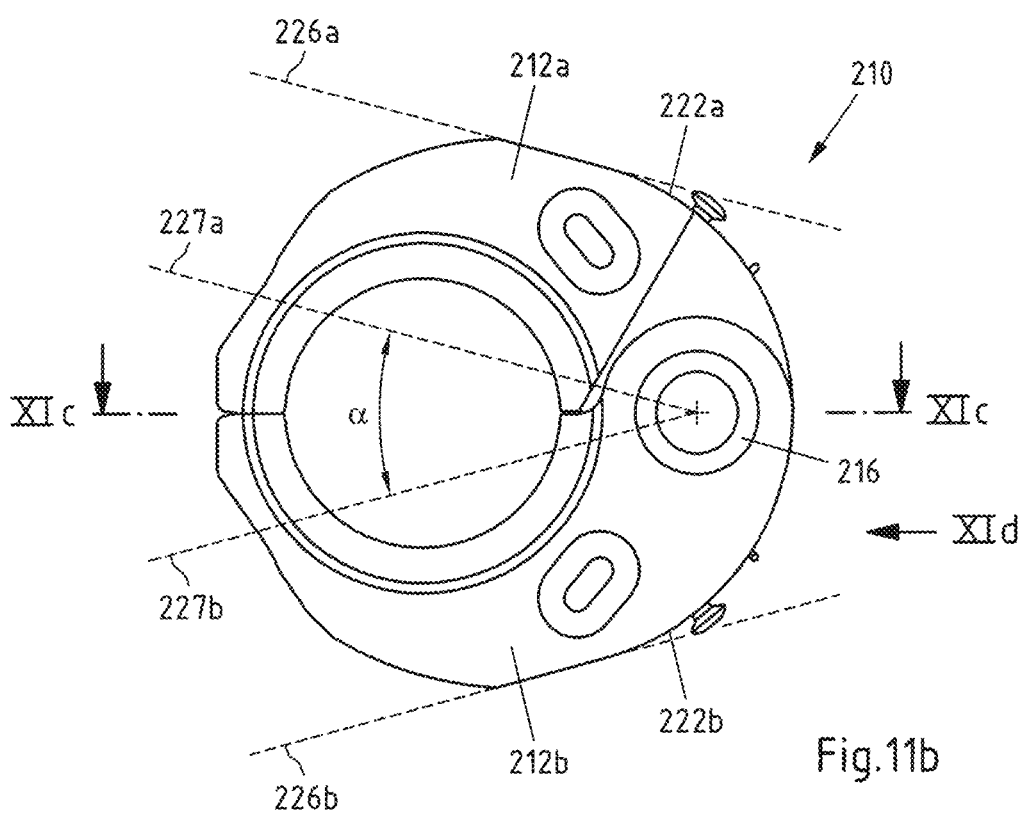
Figure 11C:
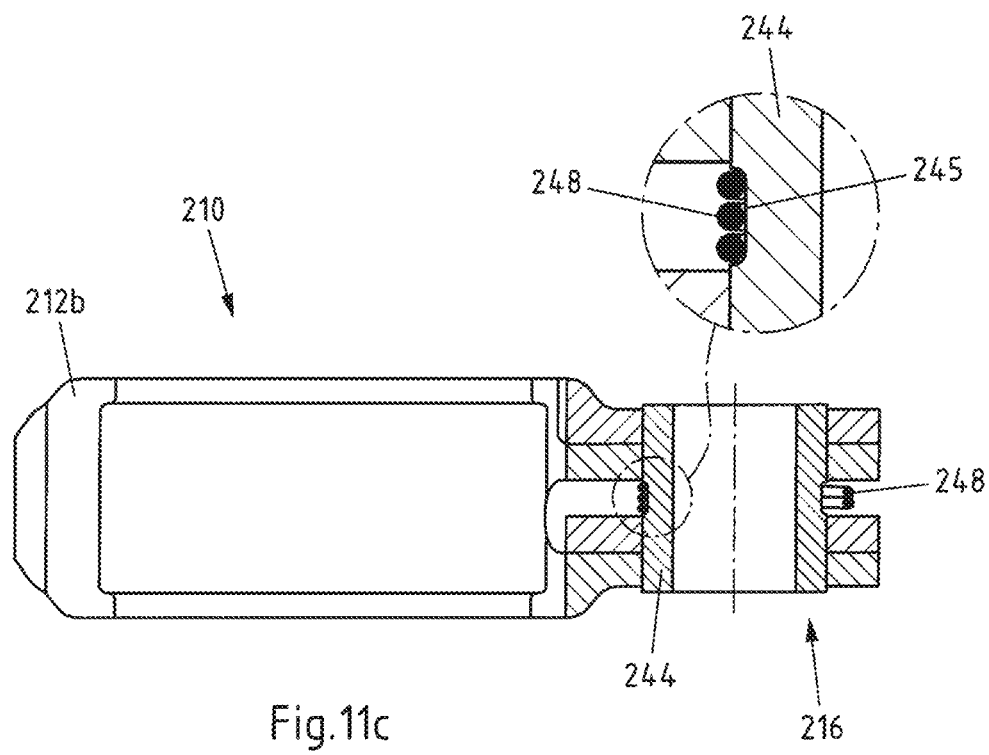
Figure 11D:
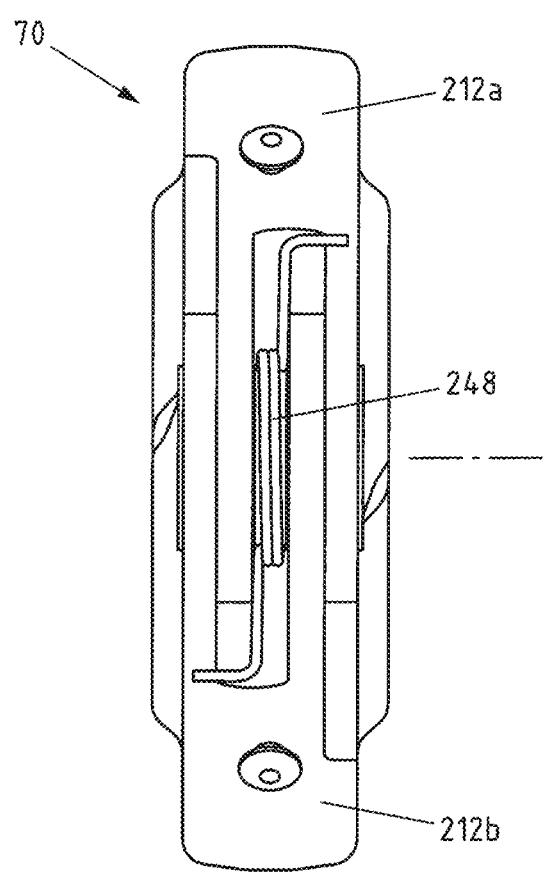

FIGS. 11a-d show the press insert 210 of the press jaw according to FIG. 7, wherein FIG. 11c shows a sectional view through the sectional axis XIc indicated in FIG. 11b and wherein FIG. 11d shows the top view of the side of the press insert 210 having the joint means 216 indicated in FIG. 11b through the direction XId.

In the perspective view shown in FIG. 11a and the sectional view shown in FIG. 11b, the force transmission means 222 of the press insert 210, which are formed as contact surfaces 222a, 222b, are clearly visible. These contact surfaces 222a, 222b and force transmission elements 242 of the drive press jaw 230, which are also formed as contact surfaces 242a, 242b, enable a two-dimensional force transmission independently of the coupling of the press insert 210 to the drive press jaw 230. During the force transmission, the outer side of the press segments 212a, 212b slides along the contact surfaces 242a, 242b and, by means of a force coupling into the press insert 210, causes pressing of the fitting with a pipe to be pressed.

The force transmission means 222 formed as contact surfaces 222a, 222b can be assigned a plane 226a, 226b so that an angle α can be defined between the planes 226a, 226b. An angle α of greater than 25° (measured with the aid of the planes 227a, 227b running parallel to the planes 226a, 226b) is shown here.

Referring to the illustration shown in FIGS. 11c and 11d, the spring 248 that axially secures the hollow pin 244 is shown.

Figure 12A:
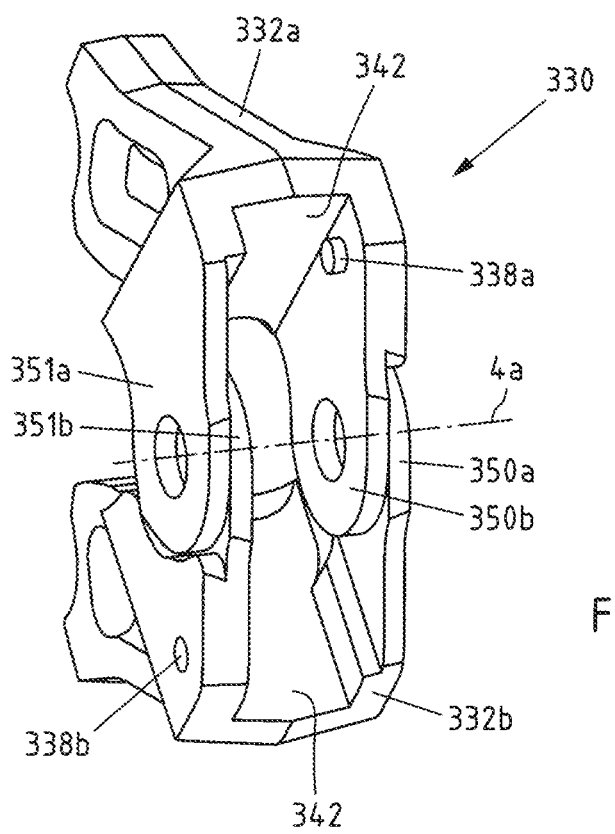
Figure 12B:
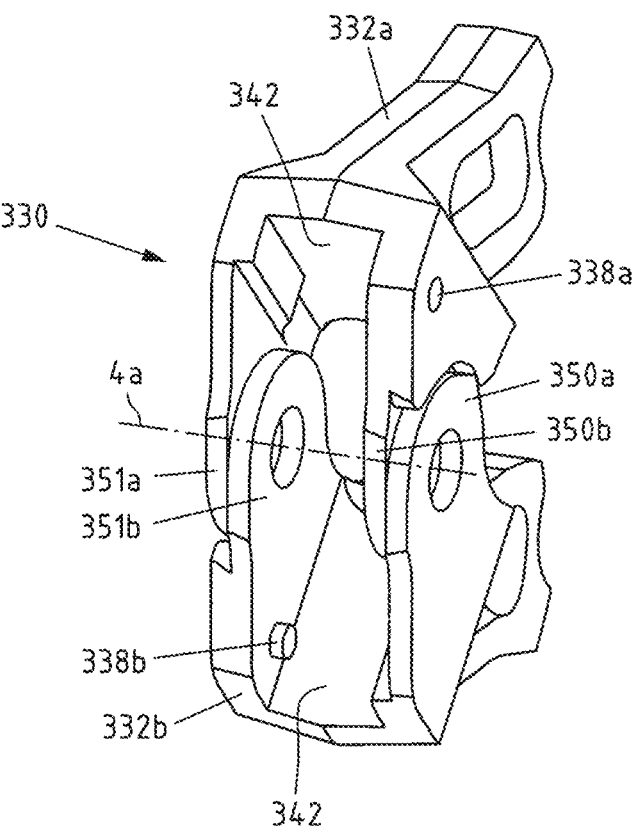
Figure 13A:
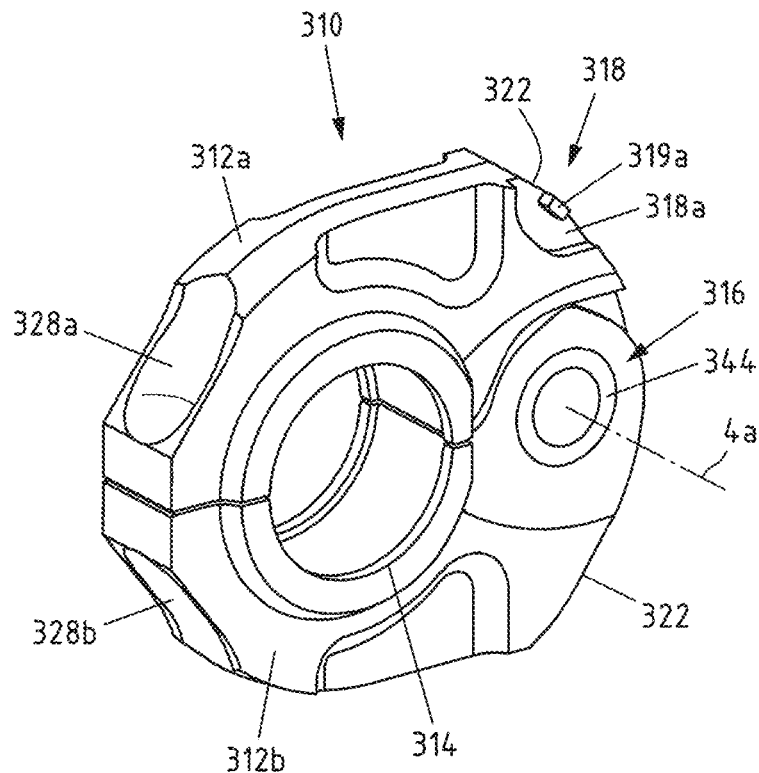
Figure 13B:
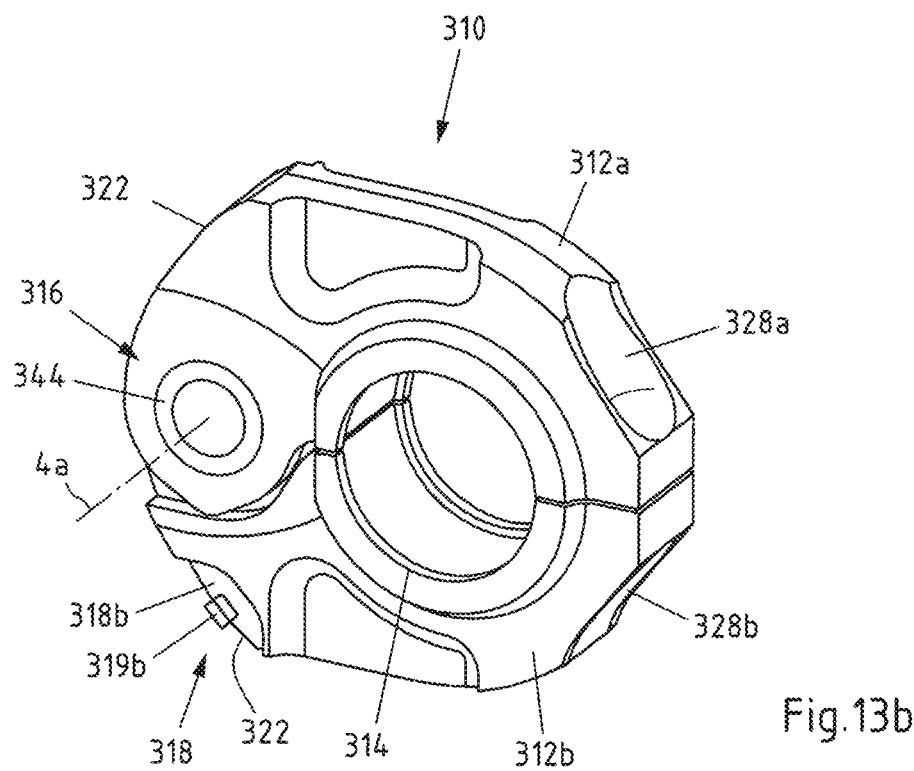

FIGS. 12a and 12b and FIGS. 13a and 13b show a third embodiment of a press including a drive press jaw 330 (FIG. 12) and a press set 310 (FIGS. 13a and 13b).

FIGS. 12a and 12b first show a third embodiment of a drive press jaw 330, which has two drive press jaw halves 332a, 332b, which in the present case are mounted pivotably about a common axis 4a. Furthermore, the drive press jaw 330 has coupling elements 338 in the form of coupling pins 338a, 338b for releasably connecting with corresponding coupling means 318 of a press insert 310. The plates 350a, 350b, 351a, 351b of the drive press jaw 330 have circular openings for receiving joint means, for example hollow bolts and a locking bolt, for releasably connecting the drive press jaw 330 to the press insert 310. The press insert 310 is mounted about the same pivotable axis 4a as the drive press jaw 330.

In FIGS. 13a and 13b, the press insert 310 is now shown with two press segments 312a, 312b in which a press contour 314 is formed. Furthermore, attachment means 328 in the form of rotationally symmetrical recesses 328a, 328b are shown, in which the pull means 74a, 74b of a pull jaw 60 engage, as well as joint means 316 in the form of a hollow pin 344, whereby the hollow pin 344 supports the press insert 310 pivotably about the axis 4a common to the drive press jaw 330.

The press insert 310 further includes coupling means 318 for releasably receiving the coupling elements 338 of the drive press jaw 330 in the form of recesses 318a, 318b. The recesses 318a, 318b are configured such that the protruding coupling pins 338a, 338b engage in the recesses 318a, 318b by abutment during the coupling process of the press insert 310 with the drive press jaw 330.

The coupling pins 338a, 338 are provided for this purpose on two opposing inner sides of the drive press jaw halves 332a, 332b of the drive press jaw 330. The recesses 318a, 318b serving as coupling means 318 are formed at two opposing locations on the outer sides of the press segments 312a, 312b of the press insert 310. The recesses 318a, 318b are arranged entirely in an area between the center of the press contour 314 of the press insert 310 and the joint means 316 of the press insert 310 and in a direction perpendicular to the horizontally aligned drive press jaw 330 with connected press insert 310 (see FIG. 15) above and below the joint means 316 of the press insert 310.

Such a configuration of the recesses 318a, 318b results in a respective projection 319a, 319b in a recess 318a, 318b, which the coupling pins 338a, 338b engage behind during the coupling process of the press insert 310 with the drive press jaw 330, the coupling pins 338a, 338b rest against the projection 319a, 319b and fit positively into the grooves formed by the recesses 318a, 318b.

The coupling process as well as the force transmission between the drive press jaw 330 and the press insert 310 is carried out analogously to the first embodiment of a press jaw 2 with drive press jaw 30 and press insert 10 already illustrated with reference to FIGS. 2 to 4. For example, the force transmission elements 342 of the drive press jaw 330 and the force transmission means 322 of the press insert 310 can be formed as contact surfaces. The joint means of the drive press jaw 330 may also be so formed in the form of hollow pins. Thus, a locking pin can be pushed through both the hollow pins of the drive press jaw 330 and the hollow pin 344 of the press insert 310 after the coupling process. In this way, the locking pin secures the connection of the drive press jaw 330 and the press insert 310 and forms the common rotation axis 4a of the drive press jaw 330 and the press insert 310.

Figure 14A:
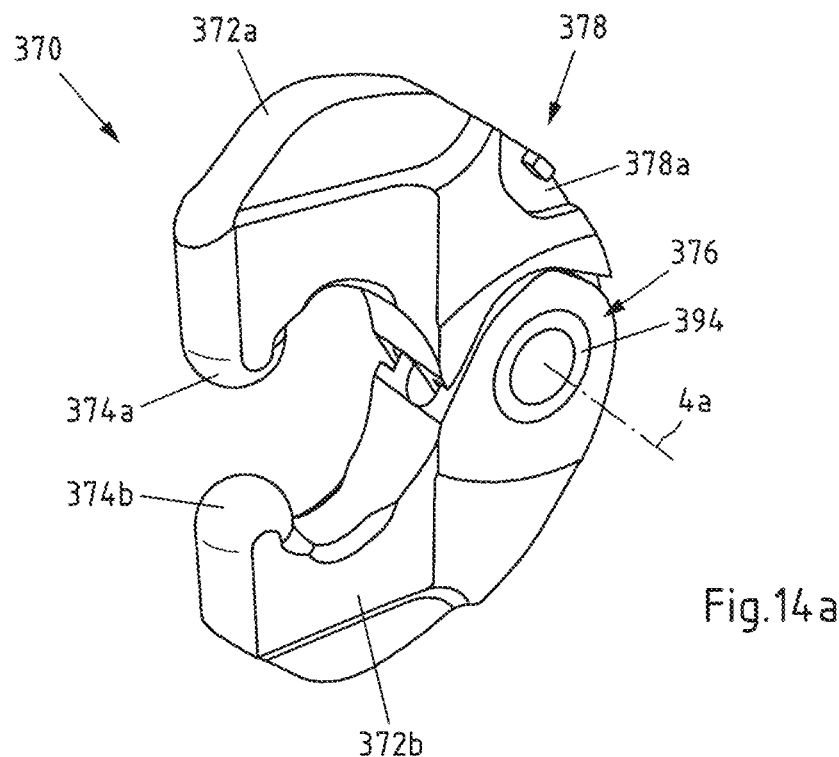
Figure 14B:
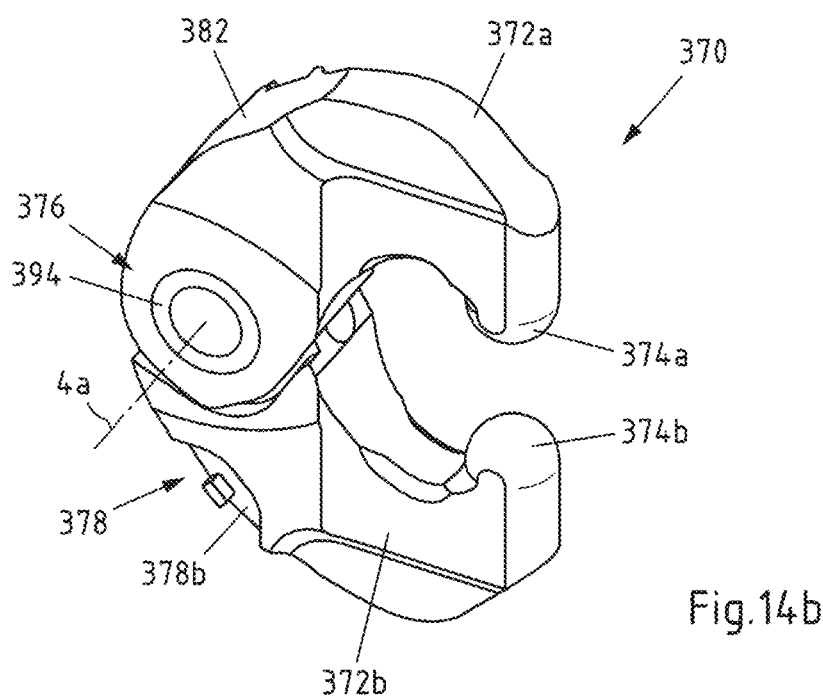

FIGS. 14a and 14b show an embodiment of a pull insert 370, in particular for connection to a drive press jaw 330 according to FIG. 12. The joint means 376 serve to connect the pull insert halves 372a, 372b. Further, coupling means 378 are provided for releasably connecting to the drive press jaw 330, here in the form of recesses 378a, 378b. The coupling means 378 come into contact with the coupling elements 338 of the drive press jaw 330, formed as coupling pins 338a, 338b, by engaging behind the coupling pins 338a, 338b.

The pull insert halves 372a, 372b each have pull means 374a, 374b opposite the joint means 376. The press insert 10, 110, 210, 310 can be pressed with the aid of the pull means 374a, 374b, which engage in the attachment means 28, 128, 228, 328 of a press insert 10, 110, 210, 310 (not shown in FIG. 14), and a drive press jaw 330 as shown in FIG. 12. In this case, the press insert 10, 110, 210, 310 serves as a press loop and pressing of fittings in working areas that are difficult to access or limited in space is simplified.

In this way, the coupling elements 338 of the drive press jaw 330 can be used for detachable connection on the one hand with a pull insert 370 as a pull jaw 60 (as schematically shown in FIGS. 1e and 1f) and on the other hand with a press insert 310 as a press jaw 302. This reduces the number of tools that have to be kept on site for pressing fittings with pipes and simplifies the pressing process.

The force transmission from the drive press jaw 330 to the pull insert 370 is effected analogously to the preceding embodiments of the press jaws 2, 102, 202, 302, by means of force transmission elements 342 of the drive press jaw 330 and force transmission means 382 of the pull insert 370. The joint means 376 of the pull insert 370 are formed as a hollow pin 394 which supports the two pull insert halves 372a, 372b pivotably about a common rotation axis 4a. The rotation axis 4a is a rotation axis 4a common to the drive press jaw halves 332a, 332b, so that the joint means 376 of the pull insert and the joint means of the drive press jaw are pivotably mounted on the same axis.

Figure 15:
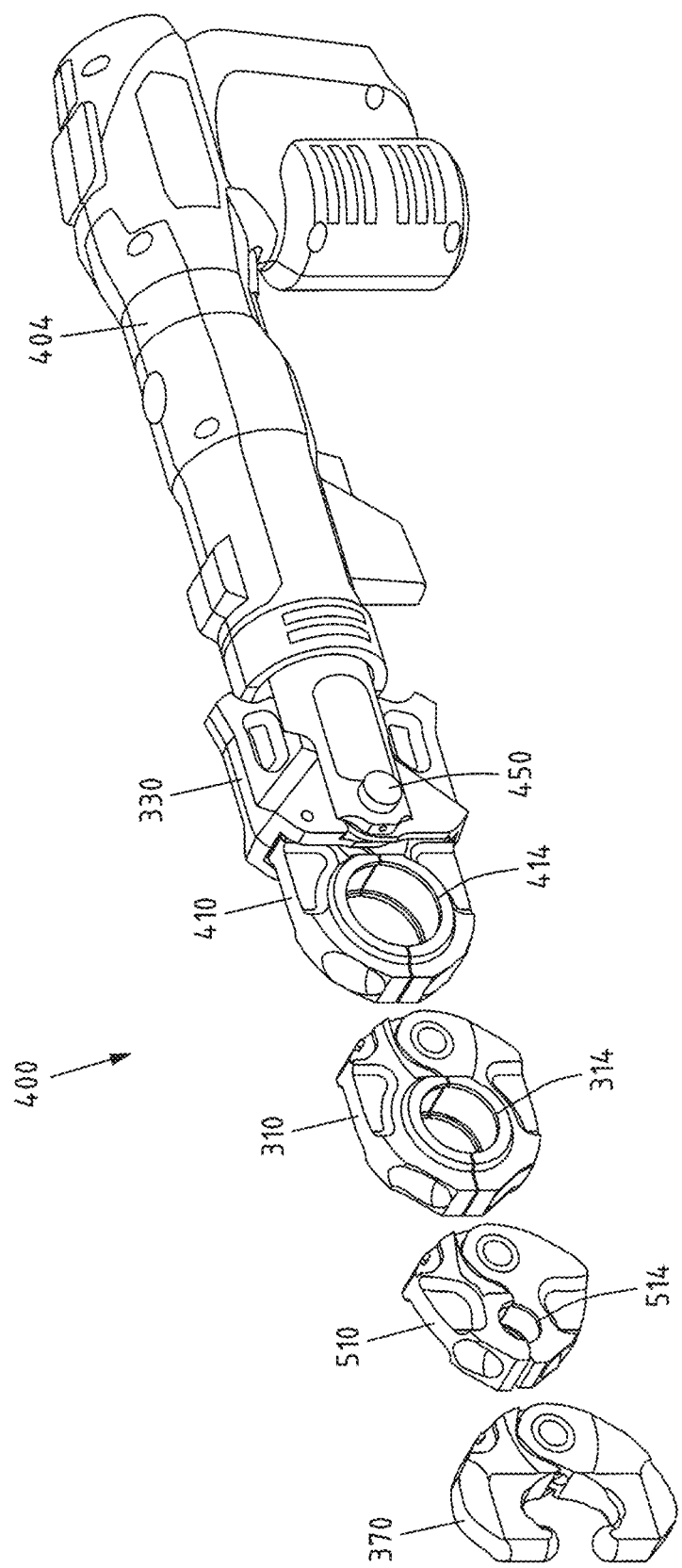

FIG. 15 shows an embodiment of a system 400 for pressing fittings with pipes, wherein the system 400 includes a pull insert 370 according to FIG. 14, a first press insert 310 according to FIG. 13, a second press insert 410, a third press insert 510 as well as a drive press jaw 330 according to FIG. 12 and further a press tool 404. The press inserts 310, 410, 510 each have different press contours 314, 414, 514, in particular for different press dimensions, for example with outer dimensions of 12, 18 and 35 mm.

The press tool 404 is releasably connected to the drive press jaw 330 by means of a locking pin 450. Advantageously, the drive press jaw 330 can be releasably connected to one of the press inserts 310, 410, 510 or to the pull insert 370 by means of the coupling elements 338, so that both a press jaw and a pull jaw can be provided by means of the same drive press jaw 330. In the present case, a press insert 410 is detachably connected to the drive press jaw 330, so that pressing of fittings with pipes can be performed with the press insert 410 and by means of a force generated by the press tool 404 and transmitted to the press insert 410 by the drive press jaw 330.

The invention claimed is:

1. A press jaw for pressing fittings with pipes, wherein the press jaw comprises:
   a press insert and
   a drive press jaw,
   wherein the press insert includes:
      at least two press segments,
      a press contour formed in the press segments,
      joint means for connecting the press segments,
      coupling means for releasably connecting with the drive press jaw; and
      power transmission means,
   wherein the drive press jaw has:
      two drive press jaw halves,
      joint elements for connecting the drive press jaw halves,
      coupling elements for releasably connecting with the press insert and
      force transmission elements,
   wherein
   the joint means pivotably connect the press insert directly to the drive press jaw about an axis extending through the joint elements, and
   the power transmission means and the force transmission elements are arranged at least predominantly in an area between the center of the press contour of the press insert and the joint means of the press insert.

2. A press jaw for pressing fittings with pipes, wherein the press jaw comprises:
   a press insert;
   a drive press jaw; and
   connection elements connecting the press insert to the drive press jaw,
   wherein the press insert includes:
      at least two press segments,
      a press contour formed in the press segments,
      joint means for connecting the press segments,
      coupling means for releasably connecting with the drive press jaw; and
      power transmission means,
   wherein the drive press jaw has:
      two drive press jaw halves,
      joint elements for connecting the drive press jaw halves,
      coupling elements for releasably connecting with the press insert and
      force transmission elements,
   wherein
   the connection elements directly connect the joint means and the joint elements, and
   the power transmission means and the force transmission elements are arranged at least predominantly in an area between the center of the press contour of the press insert and the joint means of the press insert.

3. The press jaw according to claim 2, wherein
   the power transmission means are formed as a pair of flat contact surfaces,
   the force transmission elements are formed as a pair of flat contact surfaces, and the flat contact surfaces of each of the respective pairs of flat contact surfaces have an angle (a) greater than 10° to one another.

4. The press jaw according to claim 2, wherein the press insert is pivotable about a drive press axis and the drive press jaw halves are pivotable about a drive press jaw axis or two drive press jaw axes, wherein the drive press axis and the drive press jaw axis or axes are different axes, and wherein the drive press jaw halves have an identical drive press jaw axis or different drive press jaw axes.

5. The press jaw according to claim 2, wherein
that the coupling means include coupling pins having head ends, and
the coupling elements have partially opened T-grooves and receive the coupling means.

6. The press jaw according to claim 2, wherein
the coupling elements include coupling pins and
the coupling means include recesses and receive the coupling elements.

7. The press jaw according to claim 2, wherein the press insert is formed of two components.

8. The press jaw according to claim 2, wherein the drive press jaw is formed of two components.

9. A drive press jaw for pressing fittings with pipes by means of a press insert, wherein the drive press jaw comprises:
two drive press jaw halves,
joint elements for connecting the drive press jaw halves and comprising at least one pivot joint,
coupling elements for releasably connecting with a press insert, connection elements adapted to connect the drive press jaw to the press insert, and
power transmission elements,
wherein the at least one pivot joint enables the drive press jaw halves to pivot about a common axis or about two different axes,
wherein,
the connection elements are adapted to connect the at least one pivot joint of the drive press jaw directly to a pivot joint of the press insert, and
the power transmission elements are adapted to be arranged on the press insert at least predominantly in an area between a center of a press contour of the press insert and a joint means of the press insert.

10. The drive press jaw according to claim 9, wherein,
the power transmission elements are formed as contact surfaces, and
the contact surfaces have an angle (α) greater than 10° to one another.

11. The drive press jaw according to claim 9, wherein the pivot joint of the press insert and the at least one pivot joint of the drive press jaw have an axis of rotation which is the same.

12. The drive press jaw according to claim 9, wherein the pivot joint of the press insert and the at least one pivot joint of the drive press jaw have different axes, the at least one pivot joint of the drive press element enabling the drive press jaw halves to pivot about a common axis or about different axes.

13. The drive press jaw according to claim 9, wherein,
the coupling elements for releasably receiving coupling means of the press insert have partially opened T-grooves, and
the power transmission elements are formed as contact surfaces.

14. The drive press jaw according to claim 9, wherein the coupling elements include coupling pins.

15. A press insert for pressing fittings with pipes, wherein the press insert comprises:
at least two press segments,
press contours formed in the press segments,
joint means connecting the at least two press segments and comprising a pivot joint,
coupling means for releasably connecting with a drive press jaw,
connection elements adapted to connect the press insert to the drive press jaw, and
power transmission means,
wherein,
the press segments include attachment means for attaching a pull jaw, and
the connection elements are adapted to connect the pivot joint of the press insert directly to at least one pivot joint of the drive press jaw.

16. The press insert according to claim 15, wherein the attachment means in the press segments are formed as recesses for receiving pull means of the pull jaw.

17. The press insert according to claim 16, wherein the recesses enable the pull means to be applied at at least two different angles in relation to an axis of the pipe to be pressed.

18. The press insert according to claim 15, wherein the joint means enable the press insert to be pivotably attached to a drive press jaw.

19. The press insert according to claim 15, wherein the power transmission means are formed as contact surfaces.

20. The press insert according to claim 15, wherein,
the coupling means include coupling pins and
the coupling pins are provided with head ends.

21. The press insert according to claim 15, wherein the coupling means include recesses for releasably receiving coupling elements of the drive press jaw.

22. The press insert according to claim 15, wherein an elastic spring is provided for closing the press segments.

23. A system for crimping fittings with pipes, wherein the system comprises:
at least two press inserts and
a drive press jaw,
wherein the press inserts have:
at least two press segments,
press contours formed in the press segments,
joint means for connecting the press segments,
coupling means for releasably connecting with the drive press jaw; and
power transmission means,
wherein the at least two press inserts have different press contours and
wherein the drive press jaw has:
two drive press jaw halves,
joint elements for connecting the drive press jaw halves,
coupling elements for detachably connecting with the press insert and
force transmission elements,
wherein,
at least one press insert has attachment means for attaching a pull jaw,
a pull insert is provided and includes:
two pull insert halves,
joint means for connecting the pull insert halves,
coupling means for releasably connecting with the drive press jaw,
power transmission means and
pull means opposite the joint means, wherein the coupling means and the power transmission means are arranged on the outside of the pull insert halves, the pull insert and the drive press jaw form the pull jaw, and wherein the joint means pivotably connects the at least two press inserts to the drive press jaw about an axis extending through the joint elements.

24. A system for crimping fittings with pipes, wherein the system comprises:
  at least two press inserts;
  a drive press jaw; and
  connection elements connecting the press insert to the drive press jaw,
  wherein the press inserts have:
    at least two press segments,
    press contours formed in the press segments,
    joint means for connecting the press segments,
    coupling means for releasably connecting with the drive press jaw; and
    power transmission means,
    wherein the at least two press inserts have different press contours and
  wherein the drive press jaw has:
    two drive press jaw halves,
    joint elements for connecting the drive press jaw halves,
    coupling elements for detachably connecting with the press insert and
    force transmission elements,
  wherein,
    at least one press insert has attachment means for attaching a pull jaw,
    a pull insert is provided and includes:
      two pull insert halves,
      joint means for connecting the pull insert halves,
      coupling means for releasably connecting with the drive press jaw,
      power transmission means and
      pull means opposite the joint means,
    wherein the coupling means and the power transmission means are arranged on the outside of the pull insert halves,
    the pull insert and the drive press jaw form the pull jaw, and
    the connection elements directly connect the joint means and the joint elements.

25. The system according to claim 24, wherein the pull means enable to be attached in the attachment means at at least two different angles in relation to the axis of the pipe to be pressed.

* * * * *

UNITED STATES PATENT AND TRADEMARK OFFICE
CERTIFICATE OF CORRECTION

Page 1 of 1

PATENT NO. : 12,318,896 B2
APPLICATION NO. : 18/281715
DATED : June 3, 2025
INVENTOR(S) : Rosenthal It is certified that error appears in the above-identified patent and that said Letters Patent is hereby corrected as shown below:

On the Title Page

Item (73) Assignee, Please change "Nemak, S.A.B. de C.V., Nuevo Leon (MX)" to --Viega Technology GmbH & CO. KG, Attendorn (DE)--.

Signed and Sealed this
Fifth Day of August, 2025

Coke Morgan Stewart
*Acting Director of the United States Patent and Trademark Office*